United States Patent
Yan et al.

(10) Patent No.: US 9,442,663 B2
(45) Date of Patent: Sep. 13, 2016

(54) INDEPENDENT SET/RESET PROGRAMMING SCHEME

(71) Applicant: SANDISK 3D LLC, Milpitas, CA (US)

(72) Inventors: Tianhong Yan, San Jose, CA (US); Tz-yi Liu, Palo Alto, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 126 days.

(21) Appl. No.: 14/547,473

(22) Filed: Nov. 19, 2014

(65) Prior Publication Data

US 2016/0139828 A1    May 19, 2016

(51) Int. Cl.
G06F 12/00 (2006.01)
G06F 3/06 (2006.01)

(52) U.S. Cl.
CPC ............ *G06F 3/0616* (2013.01); *G06F 3/0634* (2013.01); *G06F 3/0644* (2013.01); *G06F 3/0688* (2013.01)

(58) Field of Classification Search
CPC .. G06F 3/0616; G06F 3/0688; G06F 3/0634; G06F 3/0644
See application file for complete search history.

(56) References Cited

U.S. PATENT DOCUMENTS

2014/0022848 A1    1/2014  Samachisa

OTHER PUBLICATIONS

Balakrishnan, U.S. Appl. No. 14/515,387, entitled "Regouping and Skipping Cycles in Non-Volatile Memory," filed Oct. 15, 2014.

*Primary Examiner* — John A Lane
(74) *Attorney, Agent, or Firm* — Vierra Magen Marcus LLP

(57) ABSTRACT

Methods for operating a non-volatile memory that includes a plurality of memory arrays in which each memory array of the plurality of memory arrays may independently perform a SET operation, a RESET operation, or a read operation are described. The ability to independently SET or RESET memory arrays allows a SET operation to be performed on a first set of memory cells within a first memory array at the same time as a RESET operation is performed on a second set of memory cells within a second memory array. In some cases, the first memory array may be associated with a first memory bay and the second memory array may be associated with a second memory bay. Each memory bay may include a memory array, read/write circuits, and control circuitry for determining memory cell groupings and programming memory cells within the memory array based on the memory cell groupings.

20 Claims, 18 Drawing Sheets

| Bay 0 | RESET | RESET | RESET | RESET | RESET | SET | SET | SET | SET |
|---|---|---|---|---|---|---|---|---|---|
| Bay 1 | RESET | RESET | SET | SET | SET | SET | SET | SLEEP | SLEEP |
| ⋮ | | | | | | | | | |
| Bay 255 | RESET | RESET | RESET | SET | SLEEP | SLEEP | SLEEP | SLEEP | SLEEP |
| | Cycle 1 | Cycle 2 | Cycle 3 | Cycle 4 | Cycle 5 | Cycle 6 | Cycle 7 | Cycle 8 | Cycle 9 |

| Bay 0 | RESET | RESET | RESET | RESET | SET | SET | SET | SET | SET |
|---|---|---|---|---|---|---|---|---|---|
| Bay 1 | SET | SET | SET | SET | RESET | RESET | RESET | RESET | VERIFY |
| ⋮ | | | | | | | | | |
| Bay 255 | SET | SET | RESET | VERIFY | SLEEP | SLEEP | SLEEP | SLEEP | SLEEP |
| | Cycle 1 | Cycle 2 | Cycle 3 | Cycle 4 | Cycle 5 | Cycle 6 | Cycle 7 | Cycle 8 | Cycle 9 |

370

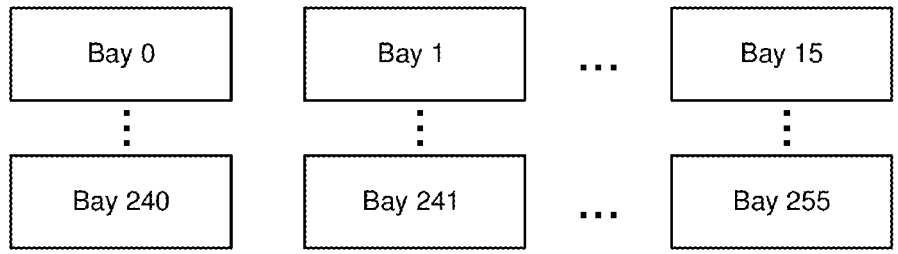

FIG. 6D

| Bay 0 | RESET | RESET | RESET | RESET | RESET | SET | SET | SET | SET |
|---|---|---|---|---|---|---|---|---|---|
| Bay 1 | RESET | RESET | SET | SET | SET | SET | SET | SLEEP | SLEEP |
| ⋮ | | | | | ⋮ | | | | |
| Bay 255 | RESET | RESET | RESET | SET | SLEEP | SLEEP | SLEEP | SLEEP | SLEEP |
| | Cycle 1 | Cycle 2 | Cycle 3 | Cycle 4 | Cycle 5 | Cycle 6 | Cycle 7 | Cycle 8 | Cycle 9 |

FIG. 6E

| Bay 0 | RESET | RESET | RESET | RESET | SET | SET | SET | SET | SET |
|---|---|---|---|---|---|---|---|---|---|
| Bay 1 | SET | SET | SET | SET | RESET | RESET | RESET | RESET | VERIFY |
| ⋮ | | | | | ⋮ | | | | |
| Bay 255 | SET | SET | RESET | VERIFY | SLEEP | SLEEP | SLEEP | SLEEP | SLEEP |
| | Cycle 1 | Cycle 2 | Cycle 3 | Cycle 4 | Cycle 5 | Cycle 6 | Cycle 7 | Cycle 8 | Cycle 9 |

FIG. 6F

INDEPENDENT SET/RESET PROGRAMMING SCHEME

BACKGROUND

Semiconductor memory is widely used in various electronic devices such as mobile computing devices, mobile phones, solid-state drives, digital cameras, personal digital assistants, medical electronics, servers, and non-mobile computing devices. Semiconductor memory may comprise non-volatile memory or volatile memory. A non-volatile memory device allows information to be stored or retained even when the non-volatile memory device is not connected to a source of power (e.g., a battery). Examples of non-volatile memory include flash memory (e.g., NAND-type and NOR-type flash memory), Electrically Erasable Programmable Read-Only Memory (EEPROM), ferroelectric memory (e.g., FeRAM), magnetoresistive memory (e.g., MRAM), and phase change memory (e.g., PRAM). In recent years, non-volatile memory devices have been scaled in order to reduce the cost per bit. However, as process geometries shrink, many design and process challenges are presented. These challenges include increased variability in memory cell characteristics over process, voltage, and temperature variations.

BRIEF DESCRIPTION OF THE DRAWINGS

FIG. 6D depicts one embodiment of a memory core.

FIG. 6E depicts one embodiment of nine programming cycles performed on each of the 256 memory bays depicted in FIG. 6D.

FIG. 6F depicts another embodiment of nine programming cycles performed on each of the 256 memory bays depicted in FIG. 6D.

DETAILED DESCRIPTION

Figure 1A:
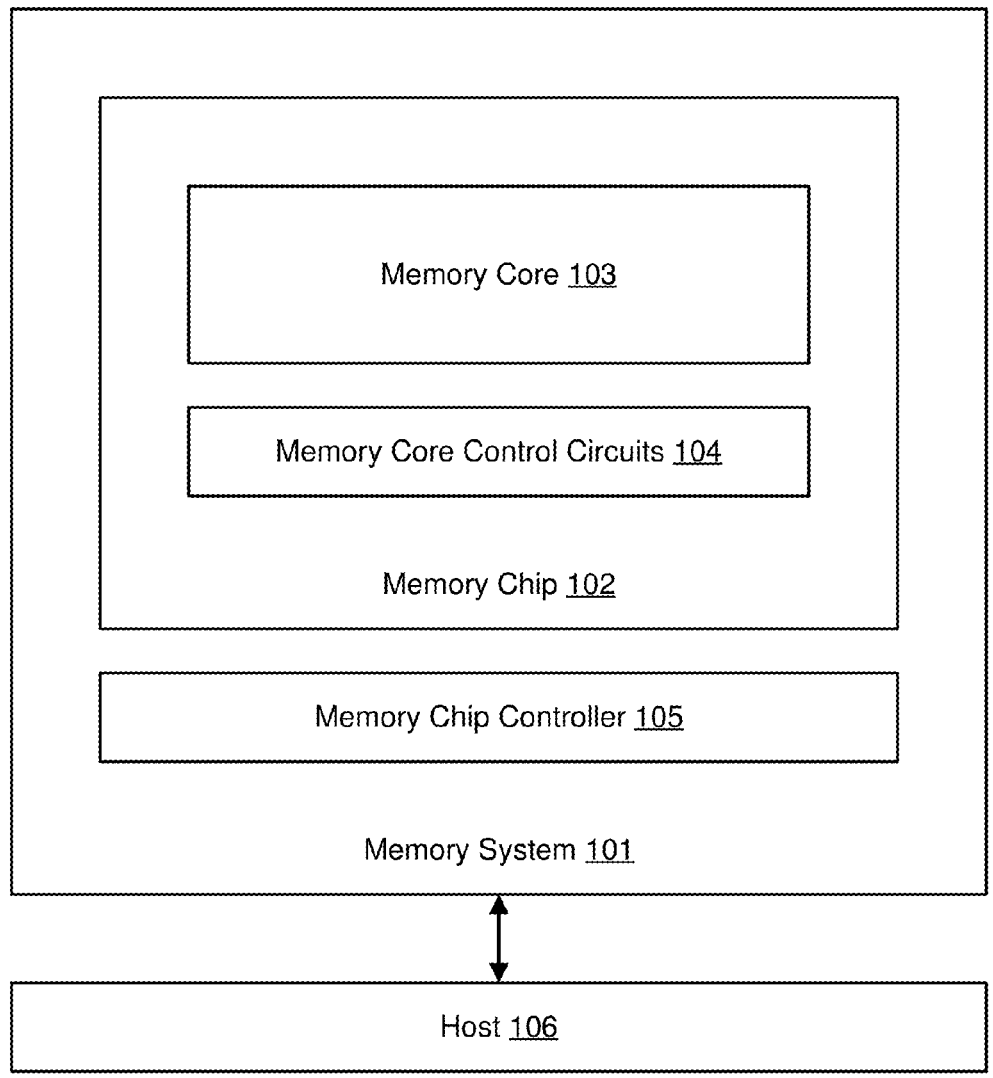
FIG. 1A depicts one embodiment of a memory system and a host.

Technology is described for operating a non-volatile storage system that includes a plurality of memory arrays in which each memory array of the plurality of memory arrays may independently perform a SET operation, a RESET operation, or a read operation. The ability to independently SET or RESET memory arrays allows a SET operation to be performed on a first set of memory cells within a first memory array at the same time as a RESET operation is performed on a second set of memory cells within a second memory array. Moreover, while two memory arrays are performing programming operations (e.g., SET or RESET operations), a third memory array may perform a read operation (e.g., a program verify operation). In some cases, the first memory array may be associated with a first memory bay and the second memory array may be associated with a second memory bay. Each memory bay may include a memory array, word line drivers connected to word lines of the memory array, bit line drivers connected to bit lines of the memory array, read/write circuits for reading and writing memory cells within the memory array, and control circuitry for determining memory cell groupings and programming memory cells within the memory array based on the memory cell groupings.

In some embodiments, control circuitry within a memory bay may acquire a set of data to be programmed to memory cells within the memory bay (e.g., a portion of a page of data, wherein the page of data is distributed across multiple memory bays), identify a first set of memory cells to be RESET based on the set of data to be programmed, identify a second set of memory cells to be SET based on the set of data to be programmed, determine a first set of bit line groupings corresponding with the first set of memory cells, determine a second set of bit line groupings corresponding with the second set of memory cells, perform a first set of programming cycles to RESET the first set of memory cells using the first set of bit line groupings, and perform a second set of programming cycles to SET the second set of memory cells using the second set of bit line groupings. In one embodiment, the first set of bit line groupings may include a first bit line grouping associated with bit line addresses for a first subset of the first set of memory cells (e.g., bit line addresses for the first sixteen memory cells to be RESET) and a second bit line grouping associated with bit line addresses for a second subset of the first set of memory cells (e.g., bit line addresses for the next sixteen memory cells to be RESET after the first sixteen memory cells have been RESET). In one embodiment, the second set of bit line groupings may include a third bit line grouping associated with bit line addresses for a third subset of the second set of memory cells (e.g., bit line addresses for the first sixteen memory cells to be SET) and a fourth bit line grouping associated with bit line addresses for a fourth subset of the second set of memory cells (e.g., bit line addresses for the next sixteen memory cells to be SET after the first sixteen memory cells have been SET). The control circuitry may include a controller, a processor, one or more state machines, and/or decode circuitry.

In some cases, the number of bit line groupings for the first set of bit line groupings may comprise the ceiling of the total number of memory cells to be RESET divided by the maximum number of memory cells that may be simultaneously programmed during a programming cycle. In one example, if the total number of memory cells to be RESET comprises 42 memory cells and the maximum number of memory cells that may be simultaneously programmed during a programming cycle comprises 16 memory cells (e.g., there are only 16 read/write circuits within a memory bay), then the number of bit line groupings for the first set of bit line groupings would be three. The number of bit line groupings for the second set of bit line groupings may comprise the ceiling of the total number of memory cells to be SET divided by the maximum number of memory cells that may be simultaneously programmed during a programming cycle. In one example, if the total number of memory cells to be SET comprises 68 memory cells and the maximum number of memory cells that may be simultaneously programmed during a programming cycle comprises 16 memory cells, then the number of bit line groupings for the second set of bit line groupings would be five.

In one embodiment, a memory chip may include 256 memory bays and a page of data may be evenly distributed across the 256 memory bays. In one example, if a page of data comprises 4 KB of data (4096 bytes or 32768 bits), then $1/256^{th}$ of the page (16 bytes or 128 bits) may be written to each of the 256 memory bays. The 16 bytes within a memory bay may correspond with memory cells connected to a word line within a memory array within the memory bay. In some cases, the number of memory cells that may be concurrently programmed (e.g., SET or RESET) may be limited due to power limitations, IR limitations, or the number of read/write circuits within the memory bay. In one example, only 16 bits of the 16 bytes may be programmed at the same time. In this case, the maximum number of programming cycles to program the 16 bytes of data may comprise nine programming cycles. In one example, if the number of bits to be RESET is 65 and the number of bits to be SET is 63, then the number of programming cycles to RESET the 65 bits is five cycles (e.g., during the first four cycles of the five cycles sixteen bits may be RESET together and in the fifth cycle of the five cycles only a single bit will be RESET) and the number of programming cycles to SET the 63 bits is four cycles (e.g., during the first three cycles of the four cycles sixteen bits may be SET together and in the fourth cycle of the four cycles only fifteen out of the sixteen bits will be SET). In some cases, RESET cycles may be performed prior to SET cycles as RESETTING memory cells within a memory array first places more memory cells within the memory array into a higher resistance state prior to SETTING other memory cells, thereby reducing leakage currents and IR drops caused by lower resistance memory cells.

In some cases, a memory array (e.g., a cross-point memory array, a three-dimensional memory array, or a ReRAM memory array) may not be able to both RESET and SET memory cells at the same time as the biasing conditions for RESETTING and SETTING memory cells may conflict. For example, when RESETTING memory cells in the memory array, the selected word line may be biased to 0V, the selected bit lines may be biased to 2V (i.e., thereby placing 2V across a selected memory cell), the unselected word lines may be biased to 1V, and the unselected bit lines may be biased to 1V. In contrast, when SETTING memory cells in the memory array, the selected word line may be biased to 2V, the selected bit lines may be biased to 0V (i.e., thereby placing −2V across a selected memory cell), the unselected word lines may be biased to 1V, and the unselected bit lines may be biased to 1V.

In some embodiments, a programming operation may include acquiring a page of data to be programmed across a plurality of memory arrays, determining a first set of data of the page of data to be programmed into a first set of memory cells within a first memory array of the plurality of memory arrays, determining a second set of data of the page of data to be programmed into a second set of memory cells within a second memory array of the plurality of memory arrays, determining a first grouping of the first set of memory cells to be programmed from a first programming state to a second programming state (e.g., memory cells to be RESET), determining a second grouping of the second set of memory cells to be programmed from the second programming state the first programming state (e.g., memory cells to be SET), programming the first grouping of the first set of memory cells from the first programming state to the second programming state during a first programming cycle, and programming the second grouping of the second set of memory cells from the second programming state to the first programming state (e.g., a SET operation) during the first programming cycle while the first grouping is programmed to the second programming state. In some cases, the first grouping may be associated with a first set of bit line addresses and the second grouping may be associated with a second set of bit line addresses different from the first set of bit line addresses. In one example, the first grouping may correspond with bit line addresses for sixteen memory cells that are to be RESET together within the first memory array and the second grouping may correspond with bit line addresses for sixteen memory cells that are to be SET together within the second memory array.

The benefits of being able to independently SET, RESET, and/or read memory arrays at the same time include faster write speeds, reduced power consumption, and reduced voltage stress across memory cells over time (e.g., during a programming sequence for programming a 4 KB page of data across 256 memory bays that each include 16 read/write circuits, memory cells may be stressed for at most nine cycles rather than being stressed for eight RESET cycles and eight SET cycles).

In some embodiments, a memory array may comprise a cross-point memory array. A cross-point memory array may refer to a memory array in which two-terminal memory cells are placed at the intersections of a first set of control lines (e.g., word lines) arranged in a first direction and a second set of control lines (e.g., bit lines) arranged in a second direction perpendicular to the first direction. The two-terminal memory cells may include a resistance-switching material, such as a phase change material, a ferroelectric material, or a metal oxide (e.g., nickel oxide or hafnium oxide). In some cases, each memory cell in a cross-point memory array may be placed in series with a steering element or an isolation element, such as a diode, in order to reduce leakage currents. In cross-point memory arrays where the memory cells do not include an isolation element, controlling and minimizing leakage currents may be a significant issue, especially since leakage currents may vary greatly over biasing voltage and temperature.

In one embodiment, a non-volatile storage system may include one or more two-dimensional arrays of non-volatile memory cells. The memory cells within a two-dimensional memory array may form a single layer of memory cells and may be selected via control lines (e.g., word lines and bit lines) in the X and Y directions. In another embodiment, a non-volatile storage system may include one or more monolithic three-dimensional memory arrays in which two or more layers of memory cells may be formed above a single substrate without any intervening substrates. In some cases, a three-dimensional memory array may include one or more vertical columns of memory cells located above and orthogonal to a substrate. In one example, a non-volatile storage system may include a memory array with vertical bit lines or bit lines that are arranged orthogonal to a semiconductor substrate. The substrate may comprise a silicon substrate. The memory array may include rewriteable non-volatile memory cells, wherein each memory cell includes a reversible resistance-switching element without an isolation element in series with the reversible resistance-switching element (e.g., no diode in series with the reversible resistance-switching element).

In some embodiments, a non-volatile storage system may include a non-volatile memory that is monolithically formed in one or more physical levels of arrays of memory cells having an active area disposed above a silicon substrate. The non-volatile storage system may also include circuitry associated with the operation of the memory cells (e.g., decoders, state machines, page registers, or control circuitry for controlling the reading or programming of the memory cells). The circuitry associated with the operation of the memory cells may be located above the substrate or located within the substrate.

In some embodiments, a non-volatile storage system may include a monolithic three-dimensional memory array. The monolithic three-dimensional memory array may include one or more levels of memory cells. Each memory cell within a first level of the one or more levels of memory cells may include an active area that is located above a substrate (e.g., a single-crystal substrate or a crystalline silicon substrate). In one example, the active area may include a semiconductor junction (e.g., a P-N junction). The active area may include a portion of a source or drain region of a transistor. In another example, the active area may include a channel region of a transistor.

In one embodiment, the memory cells within a memory array may comprise re-writable non-volatile memory cells including a reversible resistance-switching element. A reversible resistance-switching element may include a reversible resistivity-switching material having a resistivity that may be reversibly switched between two or more states. In one embodiment, the reversible resistance-switching material may include a metal oxide (e.g., a binary metal oxide). The metal oxide may include nickel oxide or hafnium oxide. In another embodiment, the reversible resistance-switching material may include a phase change material. The phase change material may include a chalcogenide material. In some cases, the re-writeable non-volatile memory cells may comprise resistive RAM (ReRAM) devices.

FIG. 1A depicts one embodiment of a memory system 101 and a host 106. The memory system 101 may comprise a non-volatile storage system interfacing with the host (e.g., a mobile computing device). In some cases, the memory system 101 may be embedded within the host 106. In other cases, the memory system 101 may comprise a memory card. As depicted, the memory system 101 includes a memory chip controller 105 and a memory chip 102. Although a single memory chip is depicted, the memory system 101 may include more than one memory chip (e.g., four or eight memory chips). The memory chip controller 105 may receive data and commands from host 106 and provide memory chip data to host 106. The memory chip controller 105 may include one or more state machines, page registers, SRAM, and control circuitry for controlling the operation of memory chip 102. The one or more state machines, page registers, SRAM, and control circuitry for controlling the operation of the memory chip may be referred to as managing or control circuits. The managing or control circuits may facilitate one or more memory array operations including forming, erasing, programming, or reading operations.

In some embodiments, the managing or control circuits (or a portion of the managing or control circuits) for facilitating one or more memory array operations may be integrated within the memory chip 102. The memory chip controller 105 and memory chip 102 may be arranged on a single integrated circuit. In other embodiments, memory chip controller 105 and memory chip 102 may be arranged on different integrated circuits. In some cases, the memory chip controller 105 and memory chip 102 may be integrated on a system board, logic board, or a PCB.

The memory chip 102 includes memory core control circuits 104 and a memory core 103. Memory core control circuits 104 may include logic for controlling the selection of memory blocks (or arrays) within memory core 103, controlling the generation of voltage references for biasing a particular memory array into a read or write state, or generating row and column addresses. The memory core 103 may include one or more two-dimensional arrays of memory cells or one or more three-dimensional arrays of memory cells. In one embodiment, the memory core control circuits 104 and memory core 103 are arranged on a single integrated circuit. In other embodiments, the memory core control circuits 104 (or a portion of the memory core control circuits) and memory core 103 may be arranged on different integrated circuits.

Referring to FIG. 1A, a memory operation may be initiated when host 106 sends instructions to memory chip controller 105 indicating that it would like to read data from memory system 101 or write data to memory system 101. In the event of a write (or programming) operation, host 106 will send to memory chip controller 105 both a write command and the data to be written. The data to be written may be buffered by memory chip controller 105 and error correcting code (ECC) data may be generated corresponding with the data to be written. The ECC data, which allows data errors that occur during transmission or storage to be detected and/or corrected, may be written to memory core 103 or stored in non-volatile memory within memory chip controller 105. In one embodiment, the ECC data is generated and data errors are corrected by circuitry within memory chip controller 105.

As depicted in FIG. 1A, the operation of memory chip 102 may be controlled by memory chip controller 105. In one example, before issuing a write operation to memory chip 102, memory chip controller 105 may check a status register to make sure that memory chip 102 is able to accept the data to be written. In another example, before issuing a read operation to memory chip 102, memory chip controller 105 may pre-read overhead information associated with the data to be read. The overhead information may include ECC data associated with the data to be read or a redirection pointer to a new memory location within memory chip 102 in which to read the data requested. Once a read or write operation is initiated by memory chip controller 105, memory core control circuits 104 may generate the appropriate bias voltages for word lines and bit lines within memory core 103, as well as generate the appropriate memory block, row, and column addresses.

In some embodiments, one or more managing or control circuits may be used for controlling the operation of a memory array. The one or more managing or control circuits may provide control signals to a memory array in order to perform a read operation and/or a write operation on the memory array. In one example, the one or more managing or control circuits may include any one of or a combination of control circuitry, state machine, decoders, sense amplifiers, read/write circuits, and/or controllers. The one or more managing circuits may perform or facilitate one or more memory array operations including erasing, programming, or reading operations. In one example, one or more managing circuits may comprise an on-chip memory controller for determining row and column address, word line and bit line addresses, memory array enable signals, and data latching signals.

Figure 1B:
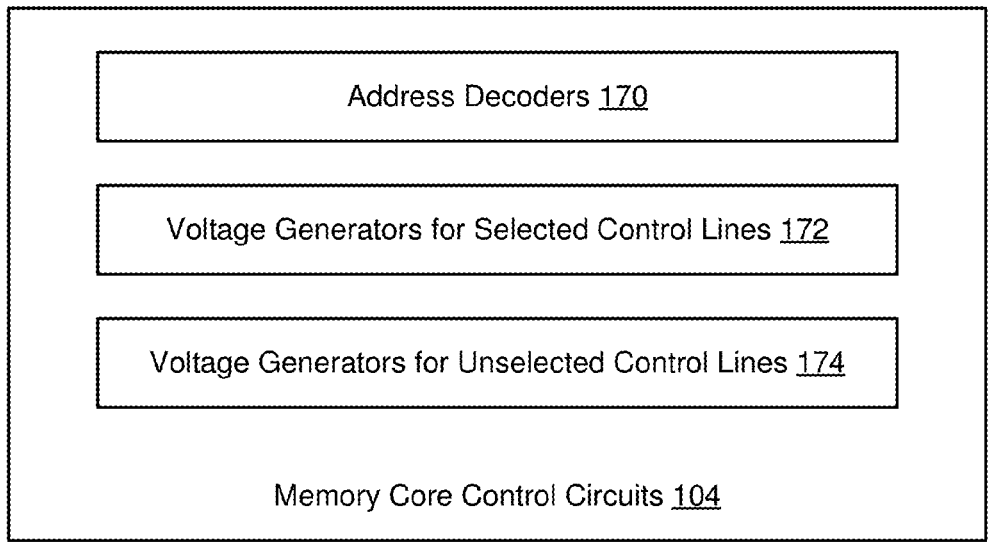
FIG. 1B depicts one embodiment of memory core control circuits.

FIG. 1B depicts one embodiment of memory core control circuits 104. As depicted, the memory core control circuits 104 include address decoders 170, voltage generators for selected control lines 172, and voltage generators for unselected control lines 174. Control lines may include word lines, bit lines, or a combination of word lines and bit lines. Selected control lines may include selected word lines or selected bit lines that are used to place memory cells into a selected state. Unselected control lines may include unselected word lines or unselected bit lines that are used to place memory cells into an unselected state. The voltage generators (or voltage regulators) for selected control lines 172 may comprise one or more voltage generators for generating selected control line voltages. The voltage generators for unselected control lines 174 may comprise one or more voltage generators for generating unselected control line voltages. Address decoders 170 may generate memory block addresses, as well as row addresses and column addresses for a particular memory block.

FIGS. 1C-1F depict one embodiment of a memory core organization that includes a memory core having multiple memory bays, and each memory bay having multiple memory blocks. Although a memory core organization is disclosed where memory bays comprise memory blocks, and memory blocks comprise a group of memory cells, other organizations or groupings can also be used with the technology described herein.

Figure 1C:
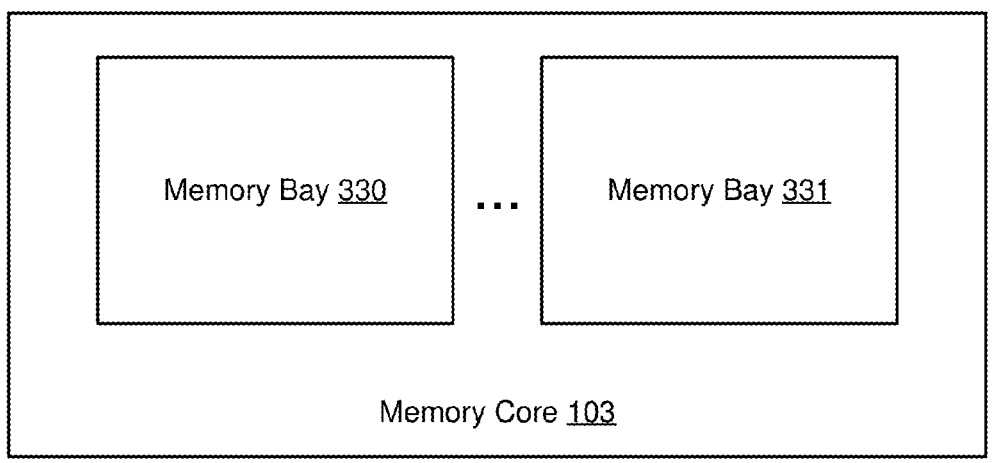
FIG. 1C depicts one embodiment of a memory core.

FIG. 1C depicts one embodiment of memory core 103 in FIG. 1A. As depicted, memory core 103 includes memory bay 330 and memory bay 331. In some embodiments, the number of memory bays per memory core can be different for different implementations. For example, a memory core may include only a single memory bay or a plurality of memory bays (e.g., 16 memory bays or 256 memory bays).

Figure 1D:
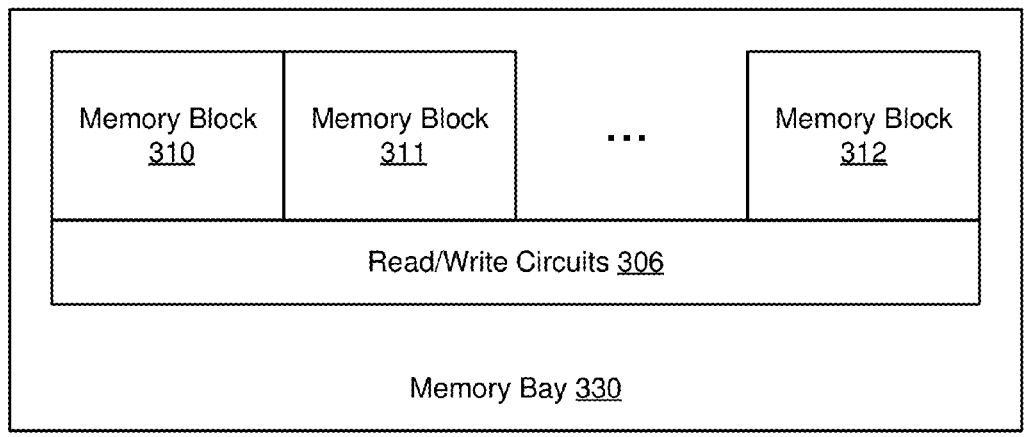
FIG. 1D depicts one embodiment of a memory bay.

FIG. 1D depicts one embodiment of memory bay 330 in FIG. 1C. As depicted, memory bay 330 includes memory blocks 310-312 and read/write circuits 306. In some embodiments, the number of memory blocks per memory bay may be different for different implementations. For example, a memory bay may include one or more memory blocks (e.g., 32 memory blocks per memory bay). Read/write circuits 306 include circuitry for reading and writing memory cells within memory blocks 310-312. As depicted, the read/write circuits 306 may be shared across multiple memory blocks within a memory bay. This allows chip area to be reduced since a single group of read/write circuits 306 may be used to support multiple memory blocks. However, in some embodiments, only a single memory block may be electrically coupled to read/write circuits 306 at a particular time to avoid signal conflicts.

In some embodiments, read/write circuits 306 may be used to write one or more pages of data into the memory blocks 310-312 (or into a subset of the memory blocks). The memory cells within the memory blocks 310-312 may permit direct over-writing of pages (i.e., data representing a page or a portion of a page may be written into the memory blocks 310-312 without requiring an erase or reset operation to be performed on the memory cells prior to writing the data). In one example, the memory system 101 in FIG. 1A may receive a write command including a target address and a set of data to be written to the target address. The memory system 101 may perform a read-before-write (RBW) operation to read the data currently stored at the target address before performing a write operation to write the set of data to the target address. The memory system 101 may then determine whether a particular memory cell may stay at its current state (i.e., the memory cell is already at the correct state), needs to be set to a "0" state, or needs to be reset to a "1" state. The memory system 101 may then write a first subset of the memory cells to the "0" state and then write a second subset of the memory cells to the "1" state. The memory cells that are already at the correct state may be skipped over, thereby improving programming speed and reducing the cumulative voltage stress applied to unselected memory cells. A particular memory cell may be set to the "1" state by applying a first voltage difference across the particular memory cell of a first polarity (e.g., +1.5V). The particular memory cell may be reset to the "0" state by applying a second voltage difference across the particular memory cell of a second polarity that is opposite to that of the first polarity (e.g., −1.5V).

In some cases, read/write circuits 306 may be used to program a particular memory cell to be in one of three or more data/resistance states (i.e., the particular memory cell may comprise a multi-level memory cell). In one example, the read/write circuits 306 may apply a first voltage difference (e.g., 2V) across the particular memory cell to program the particular memory cell into a first state of the three or more data/resistance states or a second voltage difference (e.g., 1V) across the particular memory cell that is less than the first voltage difference to program the particular memory cell into a second state of the three or more data/resistance states. Applying a smaller voltage difference across the particular memory cell may cause the particular memory cell to be partially programmed or programmed at a slower rate than when applying a larger voltage difference. In another example, the read/write circuits 306 may apply a first voltage difference across the particular memory cell for a first time period (e.g., 150 ns) to program the particular memory cell into a first state of the three or more data/resistance states or apply the first voltage difference across the particular memory cell for a second time period less than the first time period (e.g., 50 ns). One or more programming pulses followed by a memory cell verification phase may be used to program the particular memory cell to be in the correct state.

Figure 1E:
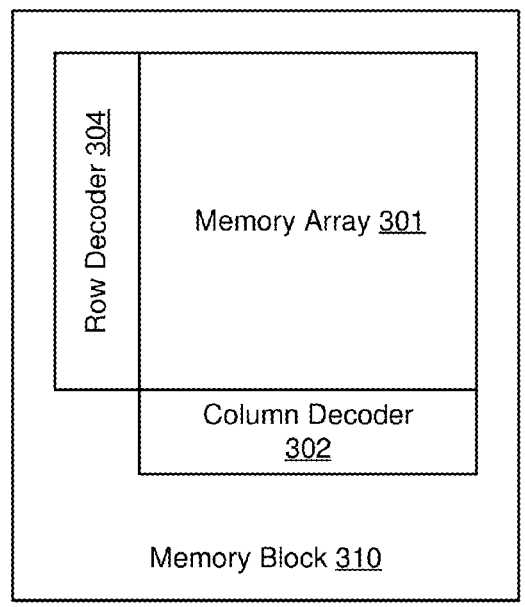
FIG. 1E depicts one embodiment of a memory block.

FIG. 1E depicts one embodiment of memory block 310 in FIG. 1D. As depicted, memory block 310 includes a memory array 301, row decoder 304, and column decoder 302. Memory array 301 may comprise a contiguous group of memory cells having contiguous word lines and bit lines. Memory array 301 may comprise one or more layers of memory cells. Memory array 310 may comprise a two-dimensional memory array or a three-dimensional memory array. The row decoder 304 decodes a row address and selects a particular word line in memory array 301 when appropriate (e.g., when reading or writing memory cells in memory array 301). The column decoder 302 decodes a column address and selects a particular group of bit lines in memory array 301 to be electrically coupled to read/write circuits, such as read/write circuits 306 in FIG. 1D. In one embodiment, the number of word lines is 4K per memory layer, the number of bit lines is 1K per memory layer, and the number of memory layers is 4, providing a memory array 301 containing 16M memory cells.

Figure 1F:
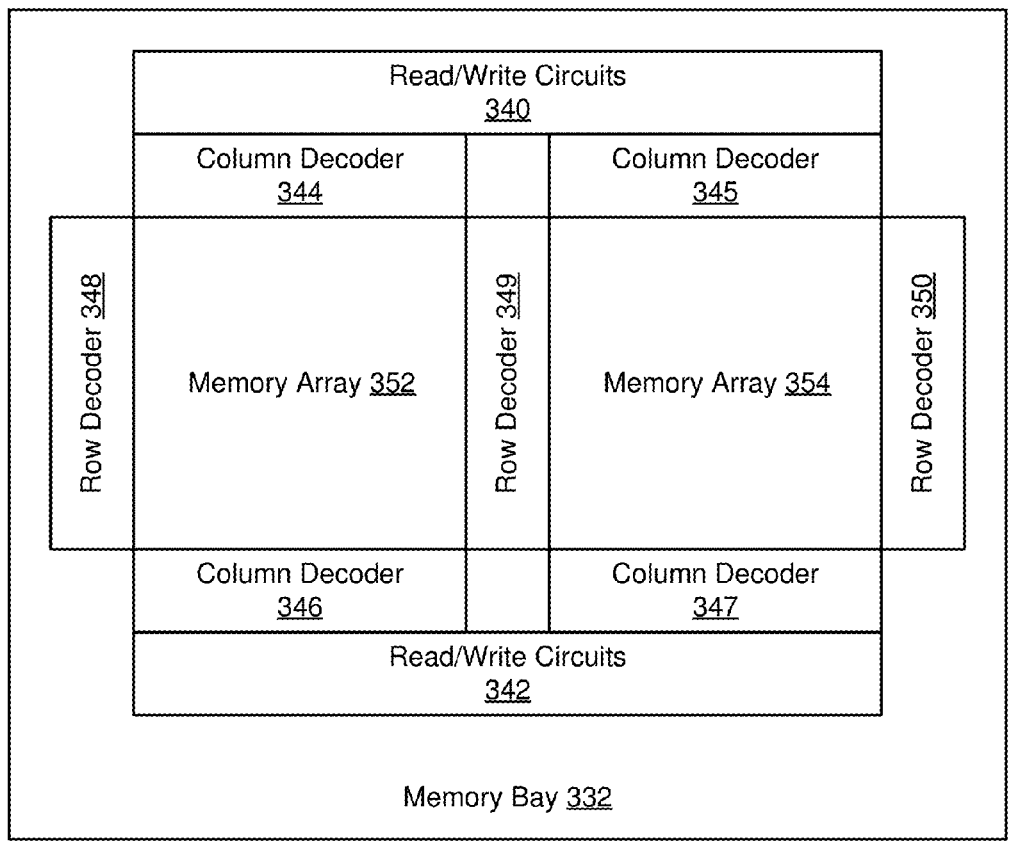
FIG. 1F depicts another embodiment of a memory bay.

FIG. 1F depicts one embodiment of a memory bay 332. Memory bay 332 is one example of an alternative implementation for memory bay 330 in FIG. 1D. In some embodiments, row decoders, column decoders, and read/write circuits may be split or shared between memory arrays. As depicted, row decoder 349 is shared between memory arrays 352 and 354 because row decoder 349 controls word lines in both memory arrays 352 and 354 (i.e., the word lines driven by row decoder 349 are shared). Row decoders 348 and 349 may be split such that even word lines in memory array 352 are driven by row decoder 348 and odd word lines in memory array 352 are driven by row decoder 349. Column decoders 344 and 346 may be split such that even bit lines in memory array 352 are controlled by column decoder 346 and odd bit lines in memory array 352 are driven by column decoder 344. The selected bit lines controlled by column decoder 344 may be electrically coupled to read/write circuits 340. The selected bit lines controlled by column decoder 346 may be electrically coupled to read/write circuits 342. Splitting the read/write circuits into read/write circuits 340 and 342 when the column decoders are split may allow for a more efficient layout of the memory bay.

Figure 2A:
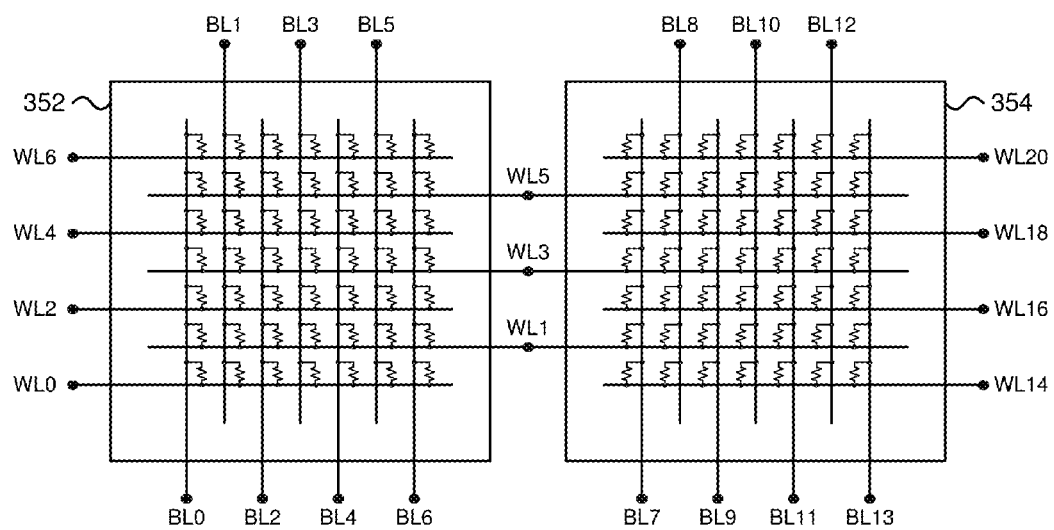
FIG. 2A depicts one embodiment of a schematic diagram corresponding with the memory bay of FIG. 1F.

FIG. 2A depicts one embodiment of a schematic diagram (including word lines and bit lines) corresponding with memory bay 332 in FIG. 1F. As depicted, word lines WL1, WL3, and WL5 are shared between memory arrays 352 and 354 and controlled by row decoder 349 of FIG. 1F. Word lines WL0, WL2, WL4, and WL6 are driven from the left side of memory array 352 and controlled by row decoder 348 of FIG. 1F. Word lines WL14, WL16, WL18, and WL20 are driven from the right side of memory array 354 and controlled by row decoder 350 of FIG. 1F. Bit lines BL0, BL2, BL4, and BL6 are driven from the bottom of memory array 352 and controlled by column decoder 346 of FIG. 1F. Bit lines BL1, BL3, and BL5 are driven from the top of memory array 352 and controlled by column decoder 344 of FIG. 1F.

In one embodiment, the memory arrays 352 and 354 may comprise memory layers that are oriented in a horizontal plane that is horizontal to the supporting substrate. In another embodiment, the memory arrays 352 and 354 may comprise memory layers that are oriented in a vertical plane that is vertical with respect to the supporting substrate (i.e., the vertical plane is perpendicular to the supporting substrate).

Figure 2B:
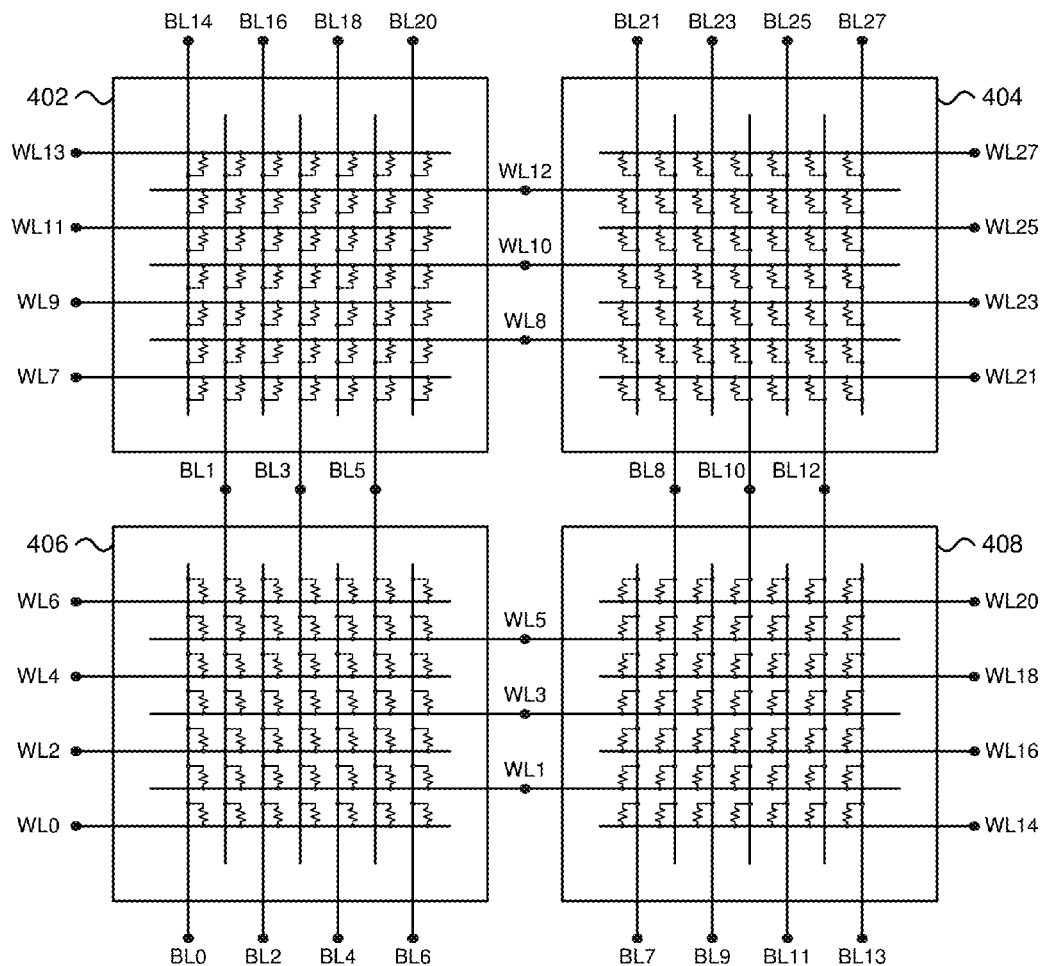
FIG. 2B depicts one embodiment of a schematic diagram corresponding with a memory bay arrangement wherein word lines and bit lines are shared across memory blocks, and both row decoders and column decoders are split.

FIG. 2B depicts one embodiment of a schematic diagram (including word lines and bit lines) corresponding with a memory bay arrangement wherein word lines and bit lines are shared across memory blocks, and both row decoders and column decoders are split. Sharing word lines and/or bit lines helps to reduce layout area since a single row decoder and/or column decoder can be used to support two memory arrays. As depicted, word lines WL1, WL3, and WL5 are shared between memory arrays 406 and 408. Bit lines BL1, BL3, and BL5 are shared between memory arrays 406 and 402. Row decoders are split such that word lines WL0, WL2, WL4, and WL6 are driven from the left side of memory array 406 and word lines WL1, WL3, and WL5 are driven from the right side of memory array 406. Column decoders are split such that bit lines BL0, BL2, BL4, and BL6 are driven from the bottom of memory array 406 and bit lines BL1, BL3, and BL5 are driven from the top of memory array 406. Splitting row and/or column decoders also helps to relieve layout constraints (e.g., the column decoder pitch can be relieved by 2× since the split column decoders need only drive every other bit line instead of every bit line).

Figure 3A:
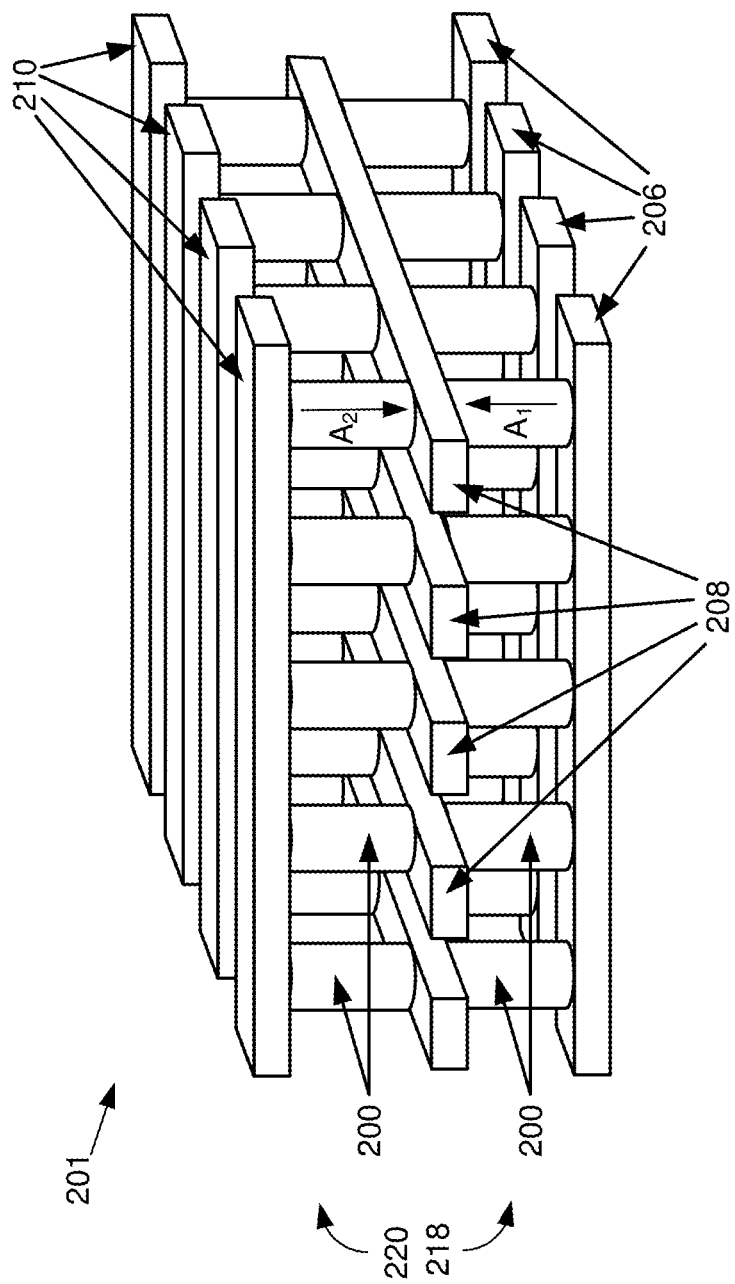
FIG. 3A depicts one embodiment of a portion of a monolithic three-dimensional memory array.

FIG. 3A depicts one embodiment of a portion of a monolithic three-dimensional memory array 201 that includes a second memory level 220 positioned above a first memory level 218. Memory array 201 is one example of an implementation for memory array 301 in FIG. 1E. The bit lines 206 and 210 are arranged in a first direction and the word lines 208 are arranged in a second direction perpendicular to the first direction. As depicted, the upper conductors of first memory level 218 may be used as the lower conductors of the second memory level 220 that is positioned above the first memory level. In a memory array with additional layers of memory cells, there would be corresponding additional layers of bit lines and word lines.

As depicted in FIG. 3A, memory array 201 includes a plurality of memory cells 200. The memory cells 200 may include re-writeable memory cells. The memory cells 200 may include non-volatile memory cells or volatile memory cells. With respect to first memory level 218, a first portion of memory cells 200 are between and connect to bit lines 206 and word lines 208. With respect to second memory level 220, a second portion of memory cells 200 are between and connect to bit lines 210 and word lines 208. In one embodiment, each memory cell includes a steering element (e.g., a diode) and a memory element (i.e., a state change element). In one example, the diodes of the first memory level 218 may be upward pointing diodes as indicated by arrow $A_1$ (e.g., with p regions at the bottom of the diodes), while the diodes of the second memory level 220 may be downward pointing diodes as indicated by arrow $A_2$ (e.g., with n regions at the bottom of the diodes), or vice versa. In another embodiment, each memory cell includes only a state change element. The absence of a diode (or other steering element) from a memory cell may reduce the process complexity and costs associated with manufacturing a memory array.

In one embodiment, the memory cells 200 of FIG. 3A comprise re-writable non-volatile memory cells including a reversible resistance-switching element. A reversible resistance-switching element may include a reversible resistivity-switching material having a resistivity that may be reversibly switched between two or more states. In one embodiment, the reversible resistance-switching material may include a metal oxide (e.g., a binary metal oxide). The metal oxide may include nickel oxide or hafnium oxide. In another embodiment, the reversible resistance-switching material may include a phase change material. The phase change material may include a chalcogenide material. In some cases, the re-writeable non-volatile memory cells may comprise resistive RAM (ReRAM) devices.

In another embodiment, the memory cells 200 of FIG. 3A may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Referring to FIG. 3A, in one embodiment of a read operation, the data stored in one of the plurality of memory cells 200 may be read by biasing one of the word lines (i.e., the selected word line) to a selected word line voltage in read mode (e.g., 0V). A read circuit may then be used to bias a selected bit line connected to the selected memory cell to the selected bit line voltage in read mode (e.g., 1.0V). In some cases, in order to avoid sensing leakage current from the many unselected word lines to the selected bit line, the unselected word lines may be biased to the same voltage as the selected bit lines (e.g., 1.0V). To avoid leakage current from the selected word line to the unselected bit lines, the unselected bit lines may be biased to the same voltage as the selected word line (e.g., 0V); however, biasing the unselected word lines to the same voltage as the selected bit lines and biasing the unselected bit lines to the same voltage as the selected word line may place a substantial voltage stress across the unselected memory cells driven by both the unselected word lines and the unselected bit lines.

In an alternative read biasing scheme, both the unselected word lines and the unselected bit lines may be biased to an intermediate voltage that is between the selected word line voltage and the selected bit line voltage. Applying the same voltage to both the unselected word lines and the unselected bit lines may reduce the voltage stress across the unselected memory cells driven by both the unselected word lines and the unselected bit lines; however, the reduced voltage stress comes at the expense of increased leakage currents associated with the selected word line and the selected bit line. Before the selected word line voltage has been applied to the selected word line, the selected bit line voltage may be applied to the selected bit line, and a read circuit may then sense an auto zero amount of current through the selected memory bit line which is subtracted from the bit line current in a second current sensing when the selected word line voltage is applied to the selected word line. The leakage current may be subtracted out by using the auto zero current sensing.

Referring to FIG. 3A, in one embodiment of a write operation, the reversible resistance-switching material may be in an initial high-resistivity state that is switchable to a low-resistivity state upon application of a first voltage and/or current. Application of a second voltage and/or current may return the reversible resistance-switching material back to the high-resistivity state. Alternatively, the reversible resistance-switching material may be in an initial low-resistance state that is reversibly switchable to a high-resistance state upon application of the appropriate voltage(s) and/or current(s). When used in a memory cell, one resistance state may represent a binary data "0" while another resistance state may represent a binary data "1." In some cases, a memory cell may be considered to comprise more than two data/resistance states (i.e., a multi-level memory cell). In some cases, a write operation may be similar to a read operation except with a larger voltage range placed across the selected memory cells.

The process of switching the resistance of a reversible resistance-switching element from a high-resistivity state to a low-resistivity state may be referred to as SETTING the reversible resistance-switching element. The process of switching the resistance from the low-resistivity state to the high-resistivity state may be referred to as RESETTING the reversible resistance-switching element. The high-resistivity state may be associated with binary data "1" and the low-resistivity state may be associated with binary data "0." In other embodiments, SETTING and RESETTING operations and/or the data encoding may be reversed. For example, the high-resistivity state may be associated with binary data "0" and the low-resistivity state may be associated with binary data "1." In some embodiments, a higher than normal programming voltage may be required the first time a reversible resistance-switching element is SET into the low-resistivity state as the reversible resistance-switching element may have been placed into a resistance state that is higher than the high-resistivity state when fabricated. The term "FORMING" may refer to setting the reversible resistance-switching element into the low-resistivity state for the first time after fabrication. After a FORMING operation has been performed, the reversible resistance-switching element may be RESET to the high-resistivity state and then SET again to the low-resistivity state.

Referring to FIG. 3A, in one embodiment of a write operation, data may be written to one of the plurality of memory cells 200 by biasing one of the word lines (i.e., the selected word line) to the selected word line voltage in write mode (e.g., 5V). A write circuit may be used to bias the bit line connected to the selected memory cell to the selected bit line voltage in write mode (e.g., 0V). In some cases, in order to prevent program disturb of unselected memory cells sharing the selected word line, the unselected bit lines may be biased such that a first voltage difference between the selected word line voltage and the unselected bit line voltage is less than a first disturb threshold. To prevent program disturb of unselected memory cells sharing the selected bit line, the unselected word lines may be biased such that a second voltage difference between the unselected word line voltage and the selected bit line voltage is less than a second disturb threshold. The first disturb threshold and the second disturb threshold may be different depending on the amount of time in which the unselected memory cells susceptible to disturb are stressed.

In one write biasing scheme, both the unselected word lines and the unselected bit lines may be biased to an intermediate voltage that is between the selected word line voltage and the selected bit line voltage. The intermediate voltage may be generated such that a first voltage difference across unselected memory cells sharing a selected word line is greater than a second voltage difference across other unselected memory cells sharing a selected bit line. One reason for placing the larger voltage difference across the unselected memory cells sharing a selected word line is that the memory cells sharing the selected word line may be verified immediately after a write operation in order to detect a write disturb.

Figure 3B:
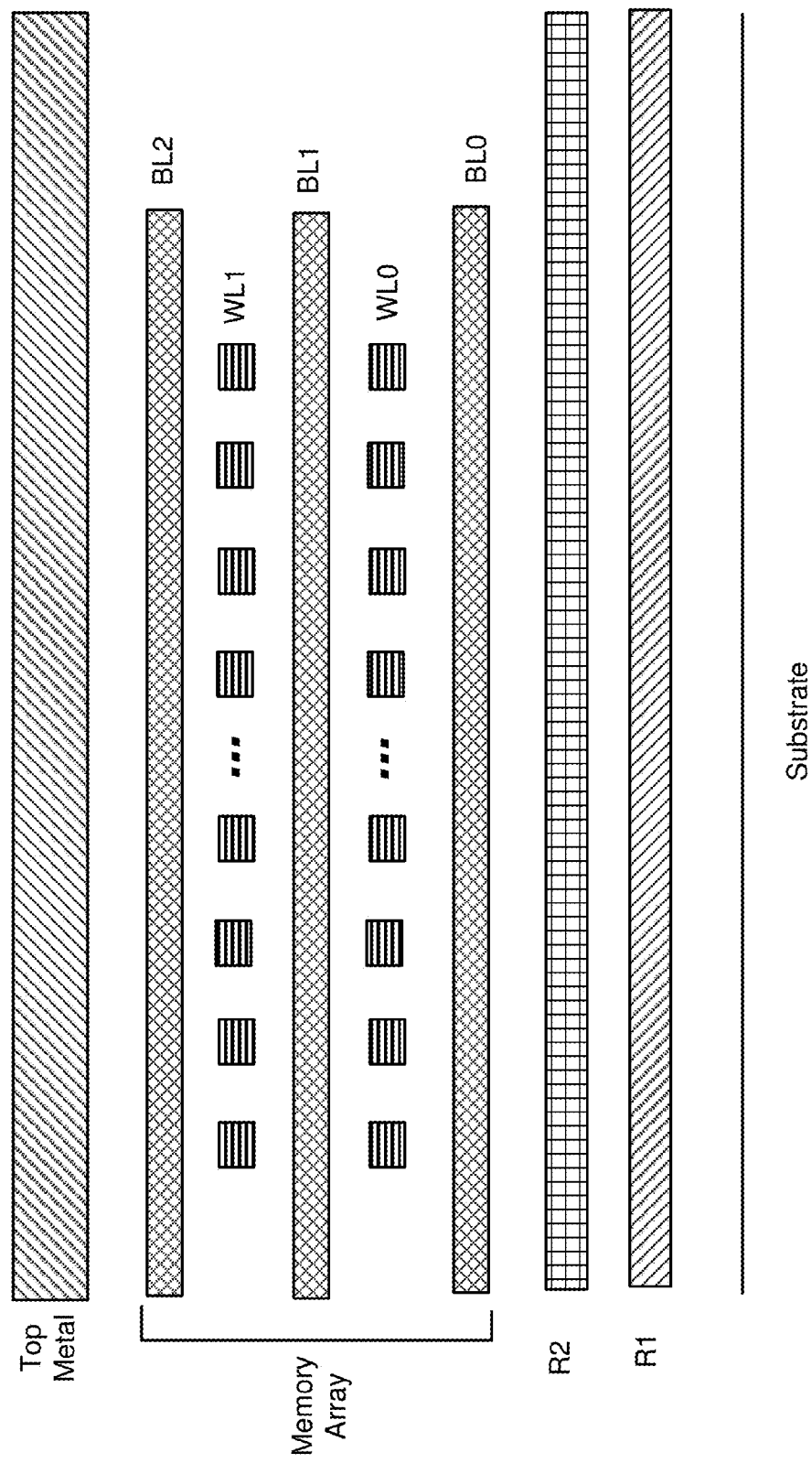
FIG. 3B depicts a subset of the memory array and routing layers of one embodiment of a three-dimensional memory array.

FIG. 3B depicts a subset of the memory array and routing layers of one embodiment of a three-dimensional memory array, such as memory array 301 in FIG. 1E. As depicted, the Memory Array layers are positioned above the Substrate. The Memory Array layers include bit line layers BL0, BL1 and BL2, and word line layers WL0 and WL1. In other embodiments, additional bit line and word line layers can also be implemented. Supporting circuitry (e.g., row decoders, column decoders, and read/write circuits) may be arranged on the surface of the Substrate with the Memory Array layers fabricated above the supporting circuitry. An integrated circuit implementing a three-dimensional memory array may also include multiple metal layers for routing signals between different components of the supporting circuitry, and between the supporting circuitry and the bit lines and word lines of the memory array. These routing layers can be arranged above the supporting circuitry that is implemented on the surface of the Substrate and below the Memory Array layers.

As depicted in FIG. 3B, two metal layers R1 and R2 are used for routing layers; however, other embodiments can include more or less than two metal layers. In one example, these metal layers R1 and R2 are formed of tungsten (about 1 ohm/square). Positioned above the Memory Array layers may be one or more top metal layers used for routing signals between different components of the integrated circuit, such as the Top Metal layer. In one example, the Top Metal layer is formed of copper or aluminum (about 0.05 ohms/square), which may provide a smaller resistance per unit area than metal layers R1 and R2. In some cases, metal layers R1 and R2 may not be implemented using the same materials as those used for the Top Metal layers because the metal used for R1 and R2 must be able to withstand the processing steps for fabricating the Memory Array layers on top of R1 and R2 (e.g., satisfying a particular thermal budget during fabrication).

Figure 3C:
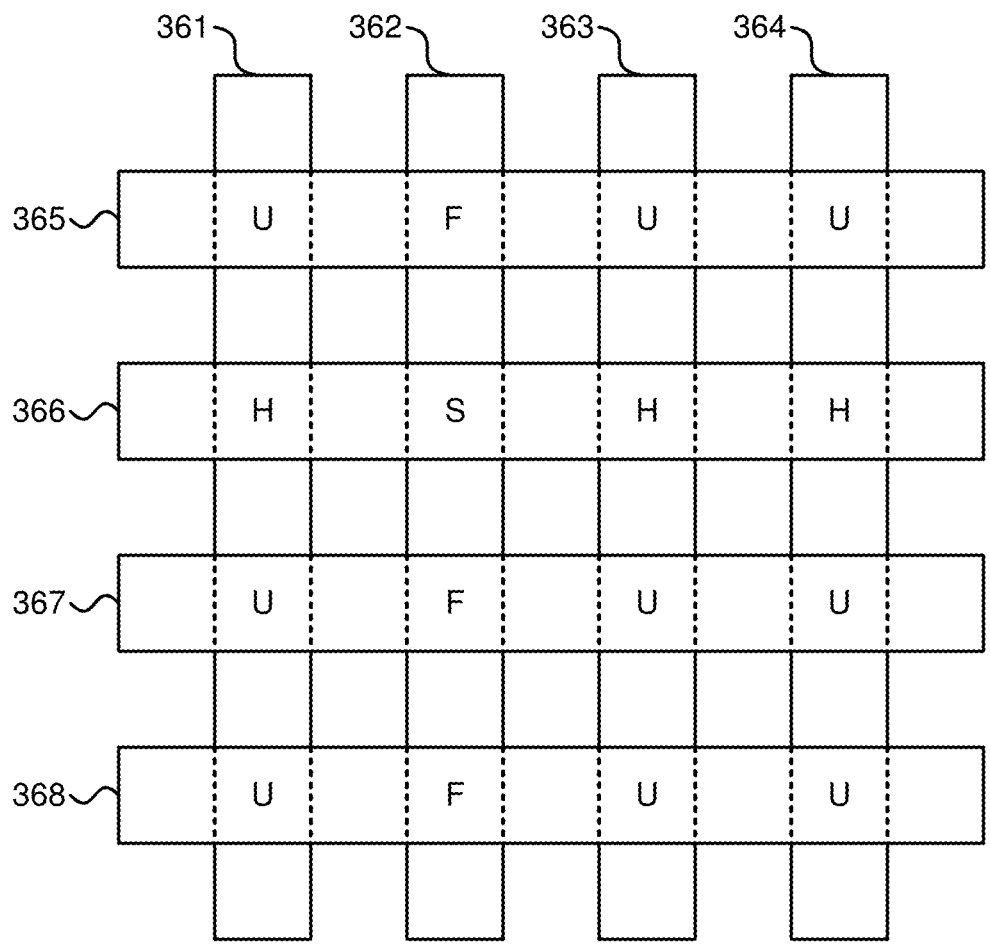
FIGS. 3C-3D depicts various embodiments of a cross-point memory array.

FIG. 3C depicts one embodiment of a cross-point memory array 360. The cross-point memory array 360 may correspond with memory array 201 in FIG. 3A. As depicted, cross-point memory array 360 includes word lines 365-368 and bit lines 361-364. Word line 366 comprises a selected word line and bit line 362 comprises a selected bit line. At the intersection of selected word line 366 and selected bit line 362 is a selected memory cell (an S cell). The voltage across the S cell is the difference between the selected word line voltage and the selected bit line voltage. Memory cells at the intersections of the selected word line 366 and the unselected bit lines 361, 363, and 364 comprise unselected memory cells (H cells). H cells are unselected memory cells that share a selected word line that is biased to the selected word line voltage. The voltage across the H cells is the difference between the selected word line voltage and the unselected bit line voltage. Memory cells at the intersections of the selected bit line 362 and the unselected word lines 365, 367, and 368 comprise unselected memory cells (F cells). F cells are unselected memory cells that share a selected bit line that is biased to a selected bit line voltage. The voltage across the F cells is the difference between the unselected word line voltage and the selected bit line voltage. Memory cells at the intersections of the unselected word lines 365, 367, and 368 and the unselected bit lines 361, 363, and 364 comprise unselected memory cells (U cells). The voltage across the U cells is the difference between the unselected word line voltage and the unselected bit line voltage.

The number of F cells is related to the length of the bit lines (or the number of memory cells connected to a bit line) while the number of H cells is related to the length of the word lines (or the number of memory cells connected to a word line). The number of U cells is related to the product of the word line length and the bit line length. In one embodiment, each memory cell sharing a particular word line, such as word line 365, may be associated with a particular page stored within the cross-point memory array 360.

Figure 3D:
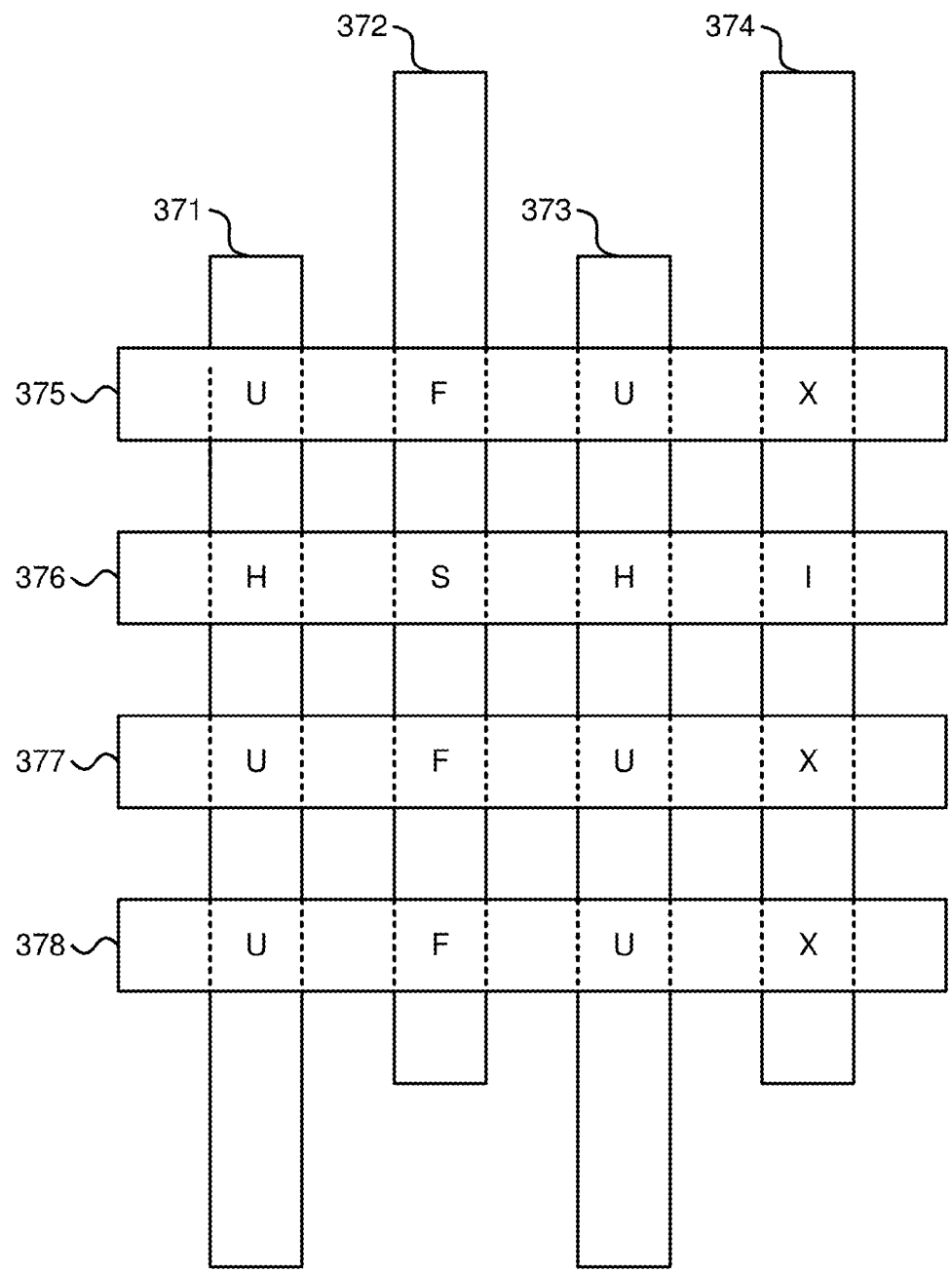

FIG. 3D depicts an alternative embodiment of a cross-point memory array 370. The cross-point memory array 370 may correspond with memory array 201 in FIG. 3A. As depicted, cross-point memory array 370 includes word lines 375-378 and bit lines 371-374. Word line 376 comprises a selected word line and bit lines 372 and 374 comprise selected bit lines. Although both bit lines 372 and 374 are selected, the voltages applied to bit line 372 and bit line 374 may be different. For example, in the case that bit line 372 is associated with a first memory cell to be programmed (i.e., an S cell), then bit line 372 may be biased to a selected bit line voltage in order to program the first memory cell. In the case that bit line 374 is associated with a second memory cell that is not to be programmed (i.e., an I cell), then bit line 374 may be biased to a program inhibit voltage (i.e., to a bit line voltage that will prevent the second memory cell from being programmed).

At the intersection of selected word line 376 and selected bit line 374 is a program inhibited memory cell (an I cell). The voltage across the I cell is the difference between the selected word line voltage and the program inhibit voltage. Memory cells at the intersections of the selected bit line 374 and the unselected word lines 375, 377, and 378 comprise unselected memory cells (X cells). X cells are unselected memory cells that share a selected bit line that is biased to a program inhibit voltage. The voltage across the X cells is the difference between the unselected word line voltage and the program inhibit voltage. In one embodiment, the program inhibit voltage applied to the selected bit line 374 may be similar to the unselected bit line voltage. In another embodiment, the program inhibit voltage may be a voltage that is greater than or less than the unselected bit line voltage. For example, the program inhibit voltage may be set to a voltage that is between the selected word line voltage and the unselected bit line voltage. In some cases, the program inhibit voltage applied may be a function of temperature. In one example, the program inhibit voltage may track the unselected bit line voltage over temperature.

In one embodiment, two or more pages may be associated with a particular word line. In one example, word line 375 may be associated with a first page and a second page. The first page may correspond with bit lines 371 and 373 and the second page may correspond with bit lines 372 and 374. In this case, the first page and the second page may correspond with interdigitated memory cells that share the same word line. When a memory array operation is being performed on the first page (e.g., a programming operation) and the selected word line 376 is biased to the selected word line voltage, one or more other pages also associated with the selected word line 376 may comprise H cells because the memory cells associated with the one or more other pages will share the same selected word line as the first page.

In some embodiments, not all unselected bit lines may be driven to an unselected bit line voltage. Instead, a number of unselected bit lines may be floated and indirectly biased via the unselected word lines. In this case, the memory cells of memory array 370 may comprise resistive memory elements without isolating diodes. In one embodiment, the bit lines 372 and 373 may comprise vertical bit lines in a three dimensional memory array comprising comb shaped word lines.

Figure 4A:
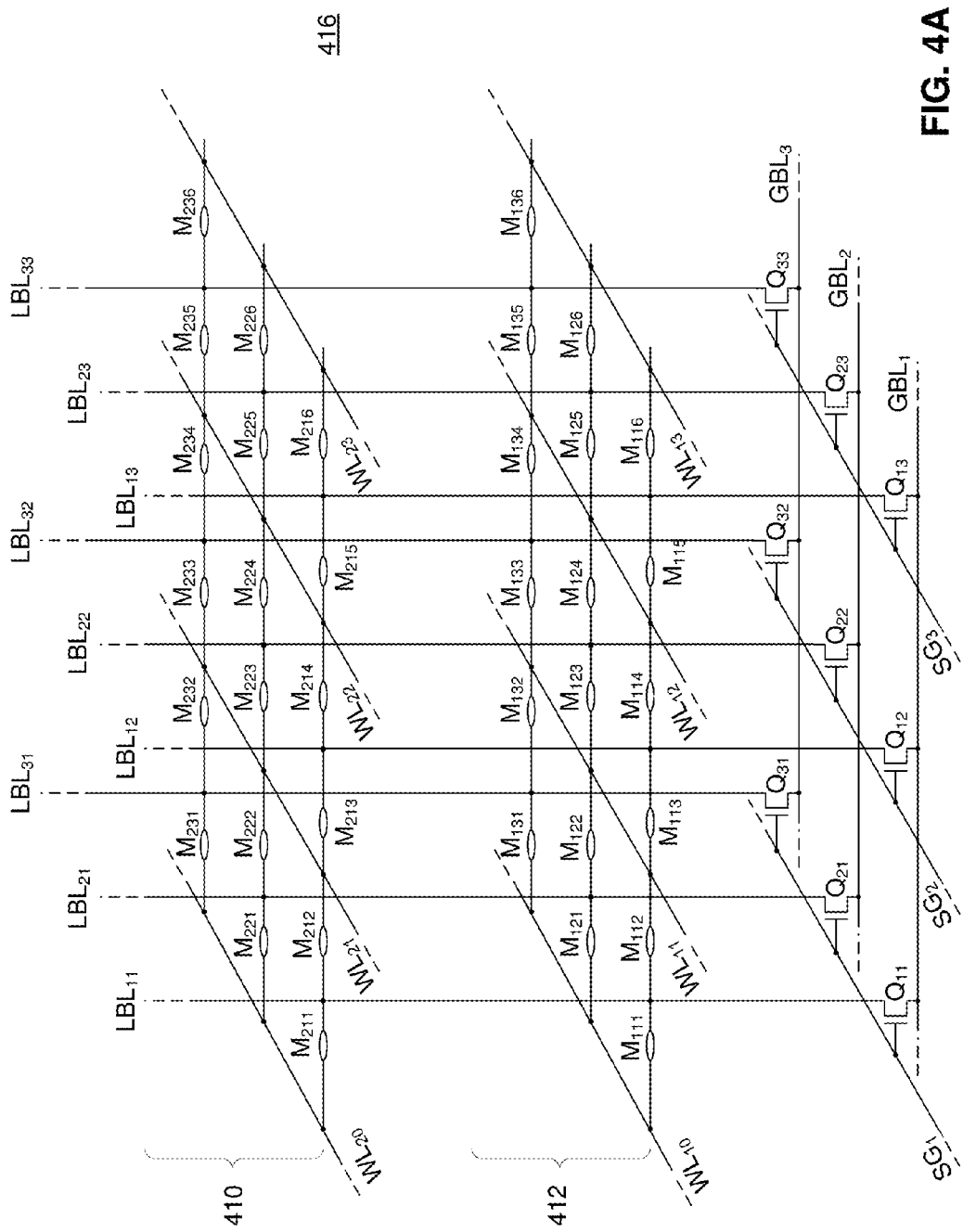
FIG. 4A depicts one embodiment of a portion of a monolithic three-dimensional memory array.

FIG. 4A depicts one embodiment of a portion of a monolithic three-dimensional memory array 416 that includes a first memory level 412 positioned below a second memory level 410. Memory array 416 is one example of an implementation for memory array 301 in FIG. 1E. The local bit lines $LBL_{11}$-$LBL_{33}$ are arranged in a first direction (i.e., a vertical direction) and the word lines $WL_{10}$-$WL_{23}$ are arranged in a second direction perpendicular to the first direction. This arrangement of vertical bit lines in a monolithic three-dimensional memory array is one embodiment of a vertical bit line memory array. As depicted, disposed between the intersection of each local bit line and each word line is a particular memory cell (e.g., memory cell $M_{111}$ is disposed between local bit line $LBL_{11}$ and word line $WL_{10}$). In one example, the particular memory cell may include a floating gate device or a charge trap device (e.g., using a silicon nitride material). In another example, the particular memory cell may include a reversible resistance-switching material, a metal oxide, a phase change material, or a ReRAM material. The global bit lines $GBL_1$-$GBL_3$ are arranged in a third direction that is perpendicular to both the first direction and the second direction. A set of bit line select devices (e.g., $Q_{11}$-$Q_{31}$) may be used to select a set of local bit lines (e.g., $LBL_{11}$-$LBL_{31}$). As depicted, bit line select devices $Q_{11}$-$Q_{31}$ are used to select the local bit lines $LBL_{11}$-$LBL_{31}$ and to connect the local bit lines $LBL_{11}$-$LBL_{31}$ to the global bit lines $GBL_1$-$GBL_3$ using row select line $SG_1$. Similarly, bit line select devices $Q_{12}$-$Q_{32}$ are used to selectively connect the local bit lines $LBL_{12}$-$LBL_{32}$ to the global bit lines $GBL_1$-$GBL_3$ using row select line $SG_2$ and bit line select devices $Q_{13}$-$Q_{33}$ are used to selectively connect the local bit lines $LBL_{13}$-$LBL_{33}$ to the global bit lines $GBL_1$-$GBL_3$ using row select line $SG_3$.

Referring to FIG. 4A, as only a single bit line select device is used per local bit line, only the voltage of a particular global bit line may be applied to a corresponding local bit line. Therefore, when a first set of local bit lines (e.g., $LBL_{11}$-$LBL_{31}$) is biased to the global bit lines $GBL_1$-$GBL_3$, the other local bit lines (e.g., $LBL_{12}$-$LBL_{32}$ and $LBL_{13}$-$LBL_{33}$) must either also be driven to the same global bit lines $GBL_1$-$GBL_3$ or be floated. In one embodiment, during a memory operation, all local bit lines within the memory array are first biased to an unselected bit line voltage by connecting each of the global bit lines to one or more local bit lines. After the local bit lines are biased to the unselected bit line voltage, then only a first set of local bit lines $LBL_{11}$-$LBL_{31}$ are biased to one or more selected bit line voltages via the global bit lines $GBL_1$-$GBL_3$, while the other local bit lines (e.g., $LBL_{12}$-$LBL_{32}$ and $LBL_{13}$-$LBL_{33}$) are floated. The one or more selected bit line voltages may correspond with, for example, one or more read voltages during a read operation or one or more programming voltages during a programming operation.

In one embodiment, a vertical bit line memory array, such as memory array 416, includes a greater number of memory cells along the word lines as compared with the number of memory cells along the vertical bit lines (e.g., the number of memory cells along a word line may be more than 10 times the number of memory cells along a bit line). In one example, the number of memory cells along each bit line may be 16 or 32, while the number of memory cells along each word line may be 2048 or more than 4096.

Figure 4B:
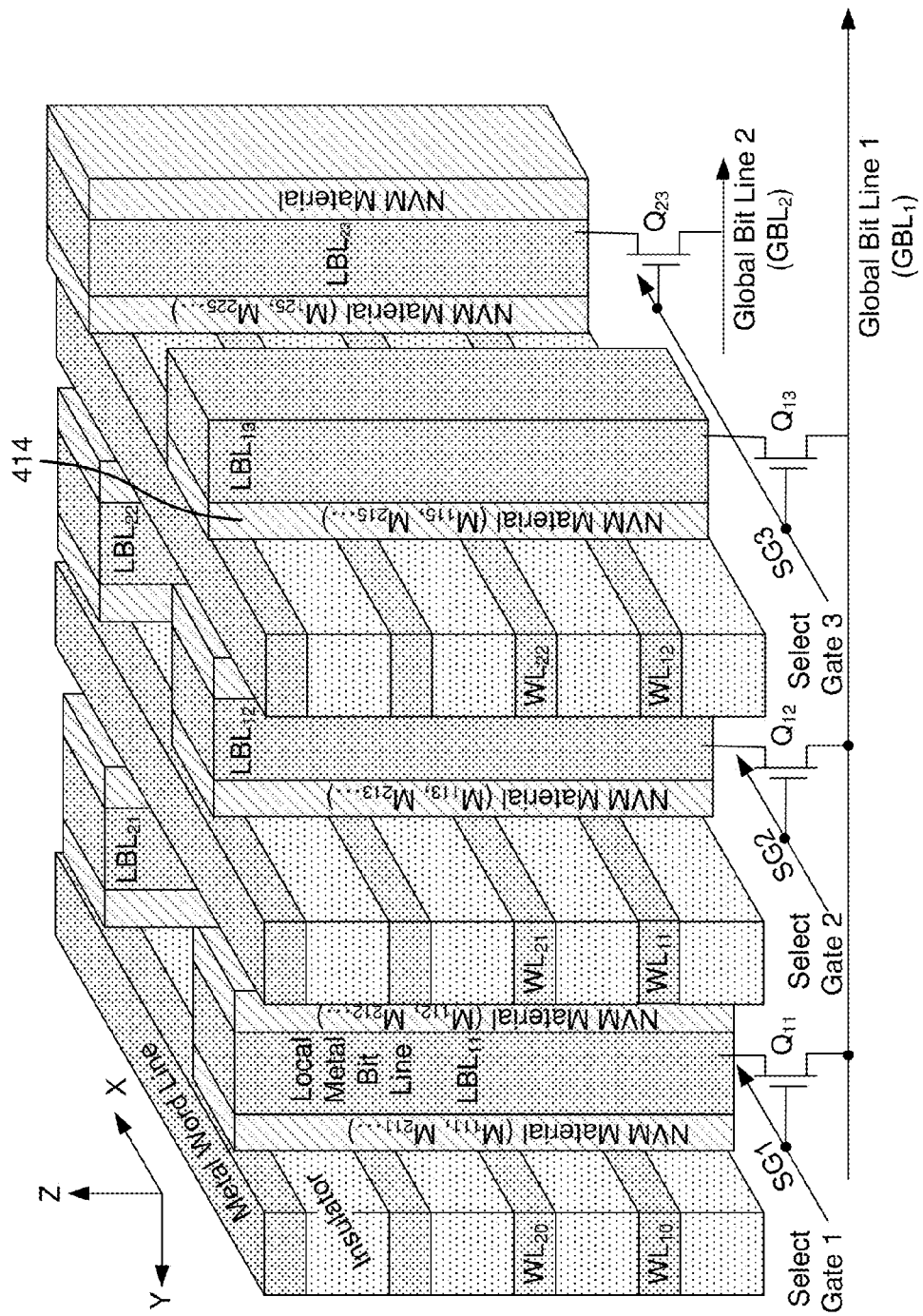
FIG. 4B depicts one embodiment of a portion of a monolithic three-dimensional memory array that includes vertical strips of a non-volatile memory material.

FIG. 4B depicts one embodiment of a portion of a monolithic three-dimensional memory array that includes vertical strips of a non-volatile memory material. The physical structure depicted in FIG. 4B may comprise one implementation for a portion of the monolithic three-dimensional memory array depicted in FIG. 4A. The vertical strips of non-volatile memory material may be formed in a direction that is perpendicular to a substrate (e.g., in the Z direction). A vertical strip of the non-volatile memory material 414 may include, for example, a vertical oxide layer, a vertical metal oxide layer (e.g., nickel oxide or hafnium oxide), a vertical layer of phase change material, or a vertical charge trapping layer (e.g., a layer of silicon nitride). The vertical strip of material may comprise a single continuous layer of material that may be used by a plurality of memory cells or devices. In one example, portions of the vertical strip of the non-volatile memory material 414 may comprise a part of a first memory cell associated with the cross section between $WL_{12}$ and $LBL_{13}$ and a part of a second memory cell associated with the cross section between $WL_{22}$ and $LBL_{13}$.

In some cases, a vertical bit line, such as $LBL_{13}$, may comprise a vertical structure (e.g., a rectangular prism, a cylinder, or a pillar) and the non-volatile material may completely or partially surround the vertical structure (e.g., a conformal layer of phase change material surrounding the sides of the vertical structure). As depicted, each of the vertical bit lines may be connected to one of a set of global bit lines via a select transistor. The select transistor may comprise a MOS device (e.g., an NMOS device) or a vertical TFT.

Figure 5:
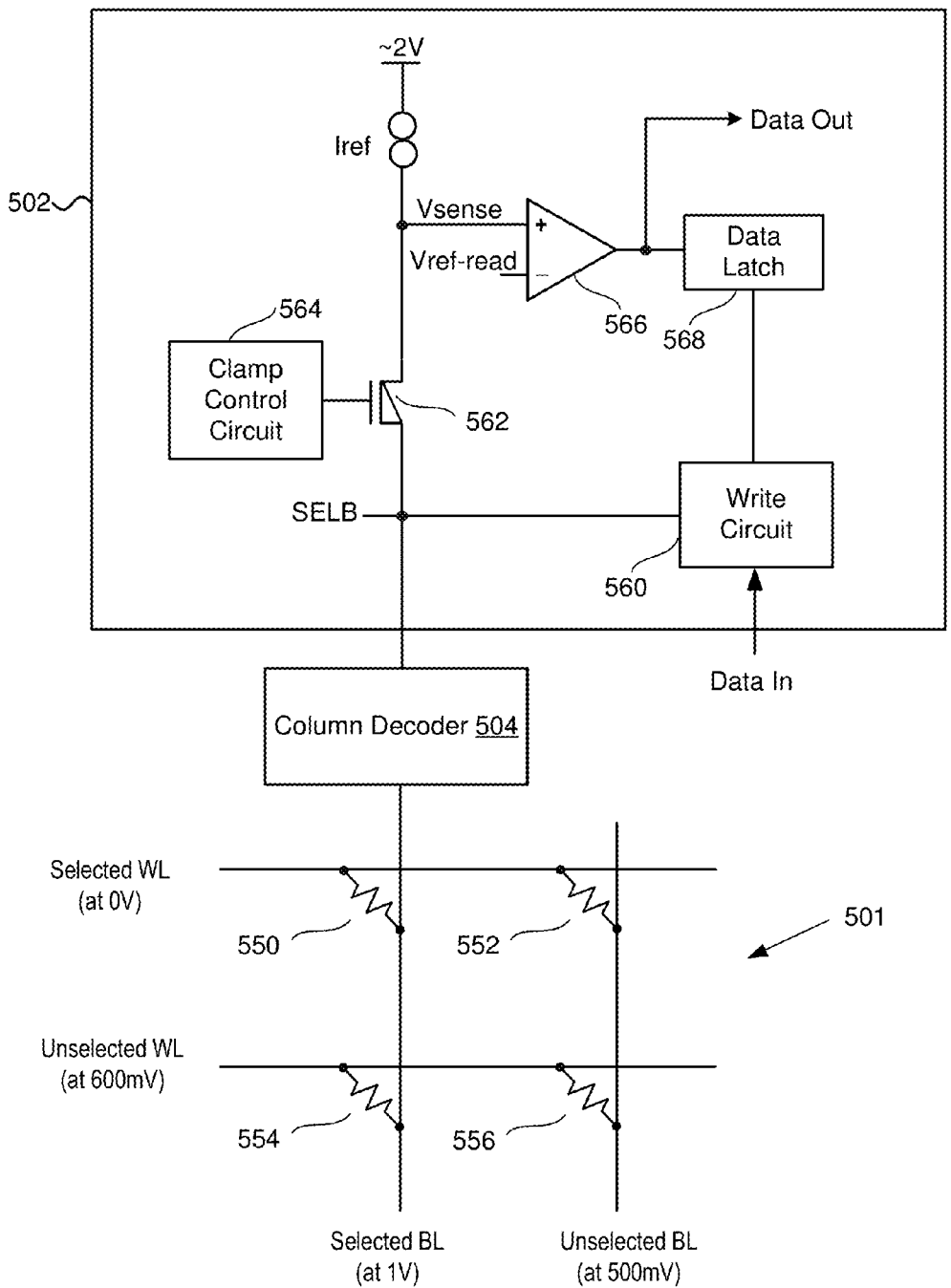
FIG. 5 depicts one embodiment of a read/write circuit along with a portion of a memory array.

FIG. 5 depicts one embodiment of a read/write circuit 502 along with a portion of a memory array 501. Read/write circuit 502 is one example of an implementation of read/write circuit 306 in FIG. 1D. The portion of a memory array 501 includes two of the many bit lines (one selected bit line labeled "Selected BL" and one unselected bit line labeled "Unselected BL") and two of the many word lines (one selected word line labeled "Selected WL" and one unselected word line labeled "Unselected WL"). The portion of a memory array also includes a selected memory cell 550 and unselected memory cells 552-556. In one embodiment, the portion of a memory array 501 may comprise a memory array with bit lines arranged in a direction horizontal to the substrate, such as memory array 201 in FIG. 3A. In another embodiment, the portion of a memory array 501 may comprise a memory array with bit lines arranged in a vertical direction that is perpendicular to the substrate, such as memory array 416 in FIG. 4A.

As depicted, during a memory array operation (e.g., a programming operation), the selected bit line may be biased to 1V, the unselected word line may be biased to 0.6V, the selected word line may be biased to 0V, and the unselected bit line may be biased to 0.5V. In some embodiments, during a second memory array operation, the selected bit line may be biased to a selected bit line voltage (e.g., 2.0V), the unselected word line may be biased to an unselected word line voltage (e.g., 1.0V), the selected word line may be biased to a selected word line voltage (e.g., 0V), and the unselected bit line may be biased to an unselected bit line voltage (e.g., 1V). In this case, the unselected memory cells sharing the selected word line will be biased to the voltage difference between the selected word line voltage and the unselected bit line voltage. In other embodiments, the memory array biasing scheme depicted in FIG. 5 may be reversed such that the selected bit line is biased to 0V, the unselected word line is biased to 0.4V, the selected word line is biased to 1V, and the unselected bit line is biased to 0.5V.

As depicted in FIG. 5, the SELB node of read/write circuit 502 may be electrically coupled to the selected bit line via column decoder 504. In one embodiment, column decoder 504 may correspond with column decoder 302 depicted in FIG. 1E. Transistor 562 couples (or electrically connects) node SELB to the Vsense node. The transistor 562 may comprise a low VT nMOS device. Clamp control circuit 564 controls the gate of transistor 562. The Vsense node is connected to reference current Iref and one input of sense amplifier 566. The other input of sense amplifier 566 receives Vref-read, which is the voltage level used for comparing the Vsense node voltage in read mode. The output of sense amplifier 566 is connected to the data out terminal and to data latch 568. Write circuit 560 is connected to node SELB, the Data In terminal, and data latch 568.

In one embodiment, during a read operation, read/write circuit 502 biases the selected bit line to the selected bit line voltage in read mode. Prior to sensing data, read/write circuit 502 will precharge the Vsense node to 2V (or some other voltage greater than the selected bit line voltage).

When sensing data, read/write circuit 502 attempts to regulate the SELB node to the selected bit line voltage (e.g., 1V) via clamp control circuit 564 and transistor 562 in a source-follower configuration. If the current through the selected memory cell 550 is greater than the read current limit, Iref, then, over time, the Vsense node will fall below Vref-read (e.g., set to 1.5V) and the sense amplifier 566 will read out a data "0." Outputting a data "0" represents that the selected memory cell 550 is in a low resistance state (e.g., a SET state). If the current through the selected memory cell 550 is less than Iref, then the Vsense node will stay above Vref-read and the sense amplifier 566 will read out a data "1." Outputting a data "1" represents that the selected memory cell 550 is in a high resistance state (e.g., a RESET state). Data latch 568 may latch the output of sense amplifier 566 after a time period of sensing the current through the selected memory cell (e.g., after 400 ns).

In one embodiment, during a write operation, if the Data In terminal requests a data "0" to be written to a selected memory cell, then read/write circuit 502 may bias SELB to the selected bit line voltage for programming a data "0" in write mode (e.g., 1.2V for a SET operation) via write circuit 560. The duration of programming the memory cell may be a fixed time period (e.g., using a fixed-width programming pulse) or variable (e.g., using a write circuit 560 that senses whether a memory cell has been programmed while programming). If the Data In terminal requests a data "1" to be written, then read/write circuit 502 may bias SELB to the selected bit line voltage for programming a data "1" in write mode (e.g., 0V or −1.2V for a RESET operation) via write circuit 560. In some cases, if a selected memory cell is to maintain its current state, then the write circuit 560 may bias SELB to a program inhibit voltage during write mode. The program inhibit voltage may be the same as or close to the unselected bit line voltage.

Figure 6A:
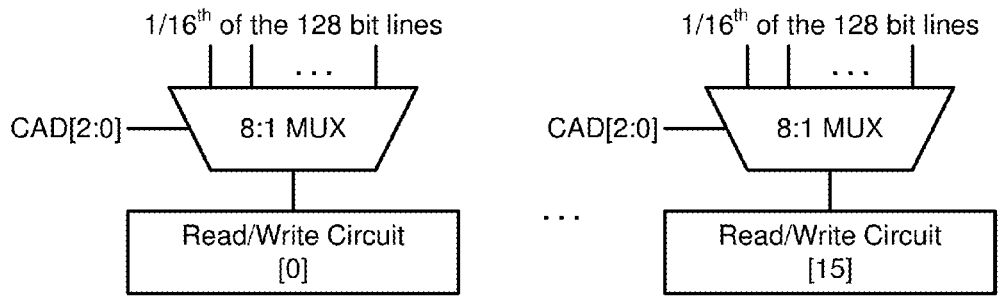
FIGS. 6A-6C depict various embodiments of a portion of a memory bay.

FIG. 6A depicts one embodiment of a portion of a memory bay. The portion of the memory bay includes a first 8:1 multiplexor (MUX) connected to a first read/write circuit (Read/Write Circuit [0]), 14 other read/write circuits associated with Read/Write Circuits [1:14] (not shown), and a fifteenth 8:1 multiplexor (MUX) connected to a fifteenth read/write circuit (Read/Write Circuit [15]). Each read/write circuit of the 16 read/write circuits may be able to read or write memory cells connected to the read/write circuit via a multiplexor that selectively connects a bit line to the read/write circuit. As depicted in FIG. 6A, each multiplexor may select a bit line out of eight bit lines based on a three-bit column address (CAD[2:0]) that is provided to each of the 16 multiplexers within the portion of the memory bay. In one example, the first read/write circuit may be able to read or write memory cells connected to bit lines 0, 16, 32, . . . , 112. The fifteenth read/write circuit may be able to read or write memory cells connected to bit lines 15, 31, 47, . . . , 127. As the same three-bit column address is provided to each of the 16 multiplexors, when CAD[2:0] is "000," then the sixteen read/write circuits may be connected to bit lines [0:15]. When CAD[2:0] is "001," then the sixteen read/write circuits may be connected to bit lines [16:31]. When CAD[2:0] is "111," then the sixteen read/write circuits may be connected to bit lines [112:127].

Figure 6B:
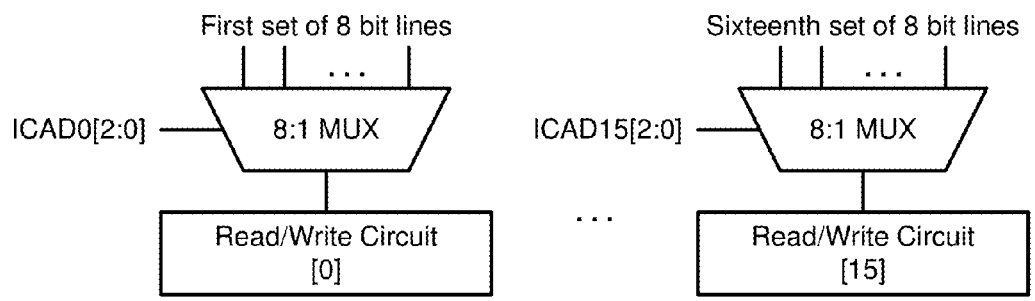

FIG. 6B depicts another embodiment of a portion of a memory bay. The portion of the memory bay includes a first 8:1 multiplexor (MUX) connected to a first read/write circuit (Read/Write Circuit [0]), 14 other read/write circuits associated with Read/Write Circuits [1:14] (not shown), and a fifteenth 8:1 multiplexor (MUX) connected to a fifteenth read/write circuit (Read/Write Circuit [15]). Each read/write circuit of the 16 read/write circuits may be able to read or write memory cells connected to the read/write circuit via a multiplexor that selectively connects a bit line to the read/write circuit. As depicted in FIG. 6B, each multiplexor may independently select a bit line out of eight bit lines based on a three-bit independent column address (e.g., ICAD0[2:0] may be used to select one out of eight bit lines for Read/Write Circuit [0] and ICAD15[2:0] may be used to select one out of eight bit lines for Read/Write Circuit [15]). In one example, the first read/write circuit may be able to read or write memory cells connected to any of bit lines 0, 16, 32, . . . , 112 (e.g., bit line [16]) while the fifteenth read/write circuit may be able to read or write memory cells connected to any of bit lines 15, 31, 47, . . . , 127 (e.g., bit line [127] may be SET using the fifteenth read/write circuit while bit line [16] is SET using the first read/write circuit). In another example, during a programming cycle, if ICAD0[2:0] is "001," then the first read/write circuit may be connected to bit line [16] and if ICAD15[2:0] is "111," then the fifteenth read/write circuit may be connected to bit line [127]. Thus, the first 8:1 multiplexor connected to the first read/write circuit may select one out of eight bit lines independently of the fifteenth 8:1 multiplexor connected to the fifteenth read/write circuit selecting one out of eight different bit lines.

In one embodiment, a non-volatile storage system may use independent column addressing for multiple memory bays. Independent column addressing permits the non-volatile storage system to provide separate column addresses to individual bays during a column address cycle. In some cases, the non-volatile storage system may determine whether a subset of memory cells associated with a column may be skipped and then combine subsets of memory cells from different columns for programming during a common column address cycle. During the column address cycle, the non-volatile storage system may provide separate column addresses to the memory bays to select different columns for programming within each memory bay. By simultaneously providing multiple column addresses during a common column address cycle, the non-volatile storage system may skip an entire column address when all bits for the column have passed verification and can skip programming for subsets of columns when all of the bits for a column have passed verification. More information regarding independent column addressing may be found in U.S. patent application Ser. No. 14/515,387, entitled "Regrouping and Skipping Cycles in Non-Volatile Memory," filed Oct. 15, 2014.

Figure 6C:
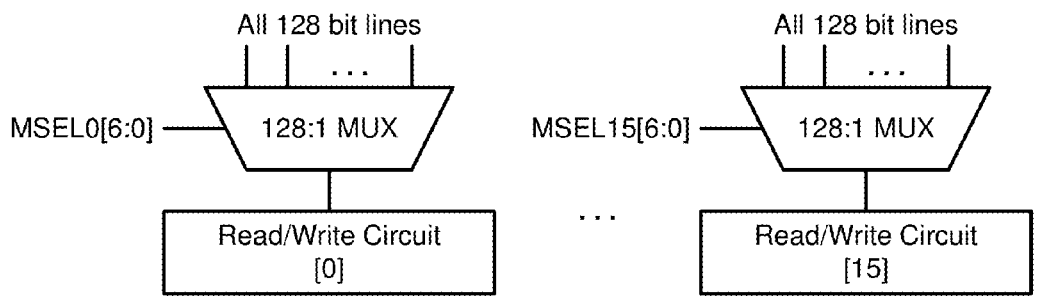

FIG. 6C depicts another embodiment of a portion of a memory bay. The portion of the memory bay includes a first 128:1 multiplexor (MUX) connected to a first read/write circuit (Read/Write Circuit [0]), 14 other read/write circuits associated with Read/Write Circuits [1:14] (not shown), and a fifteenth 128:1 multiplexor (MUX) connected to a fifteenth read/write circuit (Read/Write Circuit [15]). Each read/write circuit of the 16 read/write circuits may be able to read or write memory cells connected to the read/write circuit via a multiplexor that selectively connects a bit line to the read/write circuit. As depicted in FIG. 6C, each multiplexor may independently select a bit line out of 128 bit lines based on a seven-bit independent bit line address (e.g., MSEL0[6:0] may be used to select one out of 128 bit lines for Read/Write Circuit [0] and MSEL15[6:0] may be used to select one out of 128 bit lines for Read/Write Circuit [15]). In one example, the first read/write circuit may be able to read or write memory cells connected to any of 128 bit lines (e.g., bit line [15] or bit line [16]) while the fifteenth read/write circuit may be able to read or write memory cells connected to any of the 128 bit lines (e.g., bit line [16] may be SET using the fifteenth read/write circuit while bit line [15] is SET using the first read/write circuit). In another example, during a programming cycle, if MSEL0[6:0] is "0001111," then the first read/write circuit may be connected to bit line [15] and if MSEL15[6:0] is "001000," then the fifteenth read/write circuit may be connected to bit line [16]. Thus, the first 128:1 multiplexor connected to the first read/write circuit may select one out of 128 bit lines independently of the fifteenth 128:1 multiplexor connected to the fifteenth read/write circuit selecting one out of the 128 bit lines.

FIG. 6D depicts one embodiment of a memory core, such as memory core 103 in FIG. 1A, that includes 256 memory bays (Bay 0 through Bay 255). Each memory bay of the 256 memory bays may include one or more memory arrays. In one embodiment, a page of data may be evenly distributed across the 256 memory bays. In one example, if a page of data comprises 4 KB of data (4096 bytes or 32768 bits), then $\frac{1}{256}^{th}$ of the page (16 bytes or 128 bits) may be written to each of the 256 memory bays. The 16 bytes within a memory bay may correspond with memory cells connected to a particular word line within a particular memory array within the memory bay. In some cases, the number of memory cells that may be concurrently programmed (e.g., SET or RESET) may be limited due to the number of read/write circuits located within the memory bay. In one example, only 16 bits of the 16 bytes may be programmed at the same time.

FIG. 6E depicts one embodiment of nine programming cycles performed on each of the 256 memory bays depicted in FIG. 6D. As depicted, during the first programming cycle (Cycle 1), Bay 0 performs a RESET operation, Bay 1 performs a RESET operation, and Bay 255 performs a RESET operation. During the fourth programming cycle (Cycle 4), Bay 0 performs a RESET operation, Bay 1 performs a SET operation, and Bay 255 performs a SET operation. During the fifth programming cycle (Cycle 5), Bay 0 performs a RESET operation, Bay 1 performs a SET operation, and Bay 255 is placed into a SLEEP state or an inactive state. In one example, Bay 255 may be placed into the SLEEP state by discharging word lines and bit lines within Bay 255 to ground or by not selecting any memory cells to be programmed within Bay 255. During the sixth programming cycle (Cycle 6), Bay 0 performs a SET operation, Bay 1 performs a SET operation, and Bay 255 remains in the SLEEP state. Thus, each memory bay of the 256 memory bays may have independent control of the SET/RESET cycle boundary which may be determined based on the data pattern to be programmed into the memory bay.

In one embodiment, referring to Bay 0 in FIG. 6E, if the number of bits to be RESET within Bay 0 is 78 and the number of bits to be SET is 50, then the number of RESET cycles would be five (e.g., during the first four cycles of the five cycles sixteen bits may be RESET together and in the fifth cycle of the five cycles only fourteen of the sixteen bits will be RESET) and the number of SET cycles would be four (e.g., during the first three cycles of the four cycles sixteen bits may be SET together and in the fourth cycle of the four cycles only two out of the sixteen bits will be SET).

In one embodiment, referring to Bay 0 in FIG. 6E, prior to performing the first programming cycle, memory bay control circuits within Bay 0 may identify and group bit line addresses associated with memory cells to be RESET. In one example, the memory bay control circuits may configure the sixteen read/write circuits, such as Read/Write Circuits [0:15] in FIG. 6C, such that the sixteen read/write circuits enable RESETTING of a first group of sixteen memory cells during the first programming cycle. The first group of sixteen memory cells may correspond with sixteen non-contiguous bit lines or sixteen non-contiguous bit line addresses. For example, the first group of sixteen memory cells may correspond with bit lines 0, 1, 4, 7, 12, 14, 16, 23, 33, 34, 35, 37, 44, 45, 46, and 47 out of 128 different bit lines. Prior to performing the sixth programming cycle, the memory bay control circuits within Bay 0 may identify and group bit line addresses associated with memory cells to be SET. In one example, the memory bay control circuits may configure the sixteen read/write circuits, such as Read/Write Circuits [0:15] in FIG. 6C, such that the sixteen read/write circuits enable SETTING of a sixth group of sixteen memory cells during the sixth programming cycle. The sixth group of sixteen memory cells may correspond with sixteen non-contiguous bit lines or sixteen non-contiguous bit line addresses.

In one embodiment, referring to Bay 1 in FIG. 6E, if the number of bits to be RESET within Bay 1 is 18 and the number of bits to be SET is 67, then the number of RESET cycles would be two (e.g., during the first cycle of the two cycles sixteen bits may be RESET together and in the second cycle of the two cycles only two of the sixteen bits will be RESET) and the number of SET cycles would be five (e.g., during the first four cycles of the five cycles sixteen bits may be SET together and in the fifth cycle of the five cycles only three out of the sixteen bits will be SET). During the remaining two cycles out of the nine programming cycles, Bay 1 may be powered down and placed into a SLEEP state.

FIG. 6F depicts another embodiment of nine programming cycles performed on each of the 256 memory bays depicted in FIG. 6D. As depicted, during the first programming cycle (Cycle 1), Bay 0 performs a RESET operation, Bay 1 performs a SET operation, and Bay 255 performs a SET operation. During the fourth programming cycle (Cycle 4), Bay 0 performs a RESET operation, Bay 1 performs a SET operation, and Bay 255 performs a VERIFY operation to verify that the prior SET and RESET operations performed on Bay 255 successfully programmed the memory cells to their intended programming state. During the fifth programming cycle (Cycle 5), Bay 0 performs a SET operation, Bay 1 performs a RESET operation, and Bay 255 is placed into a SLEEP state or an inactive state. In one example, Bay 255 may be placed into an inactive state by discharging word lines and bit lines within Bay 255 to ground or by not selecting any memory cells to be programmed within Bay 255. During the ninth programming cycle (Cycle 9), Bay 0 performs a SET operation, Bay 1 performs a VERIFY operation, and Bay 255 remains in the SLEEP state.

In one embodiment, referring to Bay 0 in FIG. 6F, if the number of bits to be RESET within Bay 0 is 63 and the number of bits to be SET is 65, then the number of RESET cycles would be four (e.g., during the first three cycles of the four cycles sixteen bits may be RESET together and in the fourth cycle of the four cycles only fifteen of the sixteen bits will be RESET) and the number of SET cycles would be five (e.g., during the first four cycles of the five cycles sixteen bits may be SET together and in the fifth cycle of the five cycles only one out of the sixteen bits will be SET).

In one embodiment, for a memory bay, RESET cycles may be performed prior to SET cycles (e.g., in FIG. 6F, for Bay 0, four RESET cycles are performed prior to the five SET cycles). In some cases, RESET cycles may be performed prior to SET cycles as RESETTING memory cells within a memory array may place more memory cells within the memory array into a higher resistance state prior to SETTING other memory cells, thereby minimizing leakage currents caused by lower resistance memory cells. In another embodiment, for a memory bay, SET cycles may be performed prior to RESET cycles (e.g., in FIG. 6F, for Bay 1, four SET cycles are performed prior to the four RESET cycles).

Figure 7A:
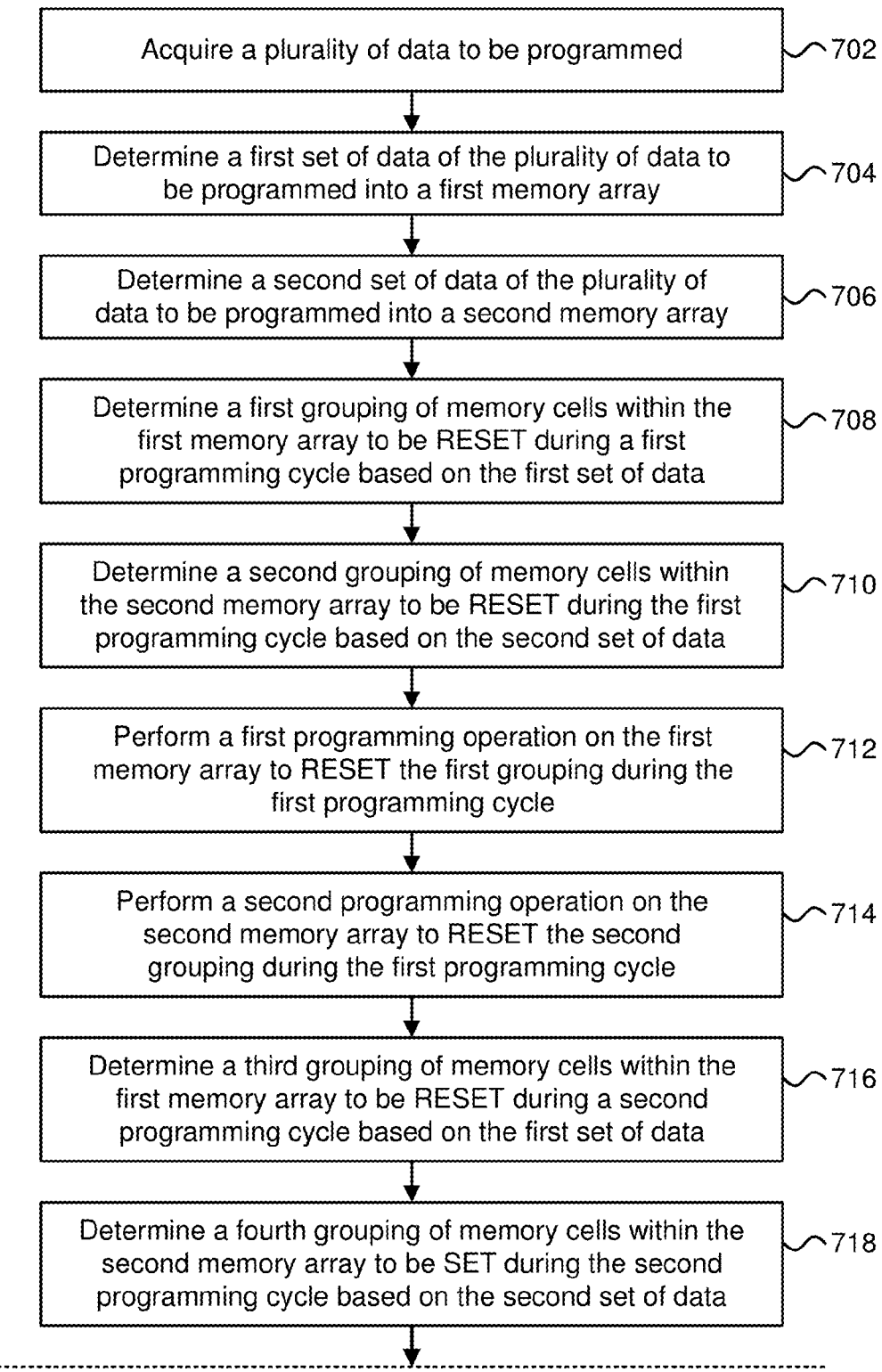
FIGS. 7A-7B depict a flowchart describing one embodiment of a process for programming a non-volatile storage system.
Figure 7B:
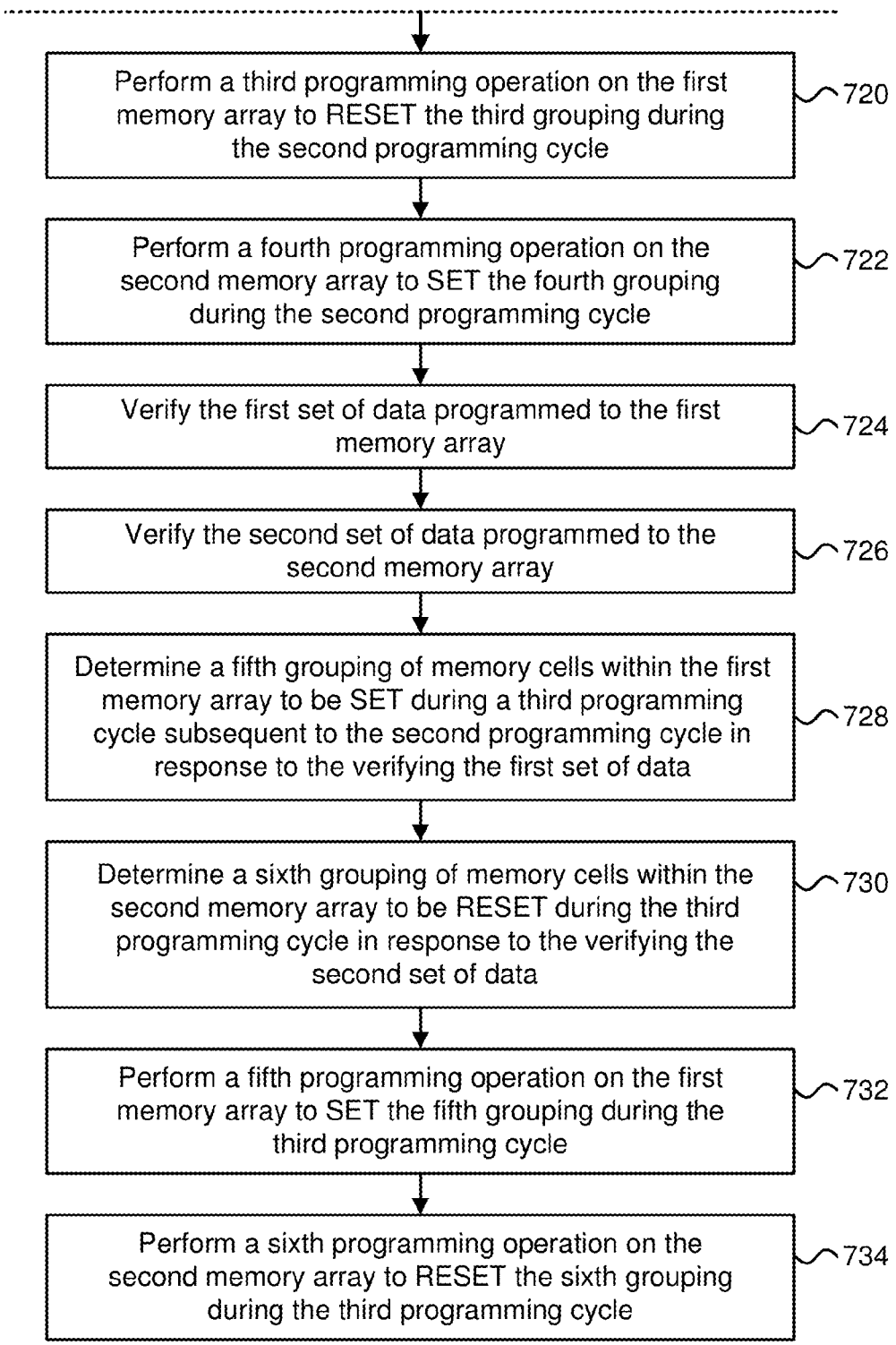

FIGS. 7A-7B depict a flowchart describing one embodiment of a process for programming a non-volatile storage system. In one embodiment, the process of FIGS. 7A-7B may be performed by a memory system, such as memory system 101 in FIG. 1A.

In step 702, a plurality of data to be programmed is acquired. The plurality of data may comprise a page of data acquired by a memory chip controller, such as memory chip controller 105 in FIG. 1A. In step 704, a first set of data of the plurality of data to be programmed into a first memory array is determined. The first set of data may comprise a first portion of a page of data. In step 706, a second set of data of the plurality of data to be programmed into a second memory array is determined. The second set of data may comprise a second portion of the page of data.

In step 708, a first grouping of memory cells within the first memory array to be RESET during a first programming cycle is determined based on the first set of data. In one embodiment, the first grouping may correspond with a grouping of memory cells within the first memory array to be programmed from a low resistance state to a high resistance state. In step 710, a second grouping of memory cells within the second memory array to be RESET during the first programming cycle is determined based on the second set of data. In one embodiment, the second subset may correspond with a grouping of memory cells within the second memory array to be programmed from a low resistance state to a high resistance state. In step 712, a first programming operation is performed on the first memory array to RESET the first grouping during the first programming cycle. In step 714, a second programming operation is performed on the second memory array to RESET the second grouping during the first programming cycle while the first programming operation is performed.

In step 716, a third grouping of memory cells within the first memory array to be RESET during a second programming cycle subsequent to the first programming cycle is determined based on the first set of data. In one example, the third grouping may comprise the next sixteen memory cells within the first memory array to be RESET after sixteen other memory cells were RESET during the first programming cycle. In step 718, a fourth grouping of memory cells within the second memory array to be SET during the second programming cycle is determined based on the second set of data. In one embodiment, the fourth grouping may correspond with a grouping of memory cells within the second memory array to be programmed from the high resistance state to the low resistance state.

In step 720, a third programming operation is performed on the first memory array to RESET the third grouping during the second programming cycle. In step 722, a fourth programming operation is performed on the second memory array to SET the fourth grouping during the second programming cycle while the third programming operation is performed. Thus, during the second programming cycle, memory cells located within the first memory array are RESET while memory cells located within the second memory array are SET.

In step 724, the first set of data programmed into the first memory array is verified. In one embodiment, the first set of data may be verified by reading data from the first memory array and comparing the data read back with the first set of data. In one example, a bit-wise XOR operation may be performed to determine whether the first set of data matches with the data read back from the first memory array. In step 726, the second set of data programmed into the second memory array is verified. In one embodiment, the second set of data may be verified by reading data from the second memory array and comparing the data read back with the second set of data. In one example, a bit-wise XOR operation may be performed to determine whether the second set of data matches with the data read back from the second memory array.

In step 728, a fifth grouping of memory cells within the first memory array to be SET during a third programming cycle subsequent to the second programming cycle is determined in response to the verifying the first set of data. The fifth grouping may correspond with memory cells that failed to be SET during a previous programming cycle. In step 730, a sixth grouping of memory cells within the second memory array to be RESET during the third programming cycle is determined in response to the verifying the second set of data. The sixth grouping may correspond with memory cells that failed to be RESET during a previous programming cycle. In step 732, a fifth programming operation is performed on the first memory array to SET the fifth grouping during the third programming cycle. In step 734, a sixth programming operation is performed on the second memory array to RESET the sixth grouping during the third programming cycle. Thus, during the third programming cycle, memory cells located within the first memory array are SET while memory cells located within the second memory array are RESET.

Figure 8:
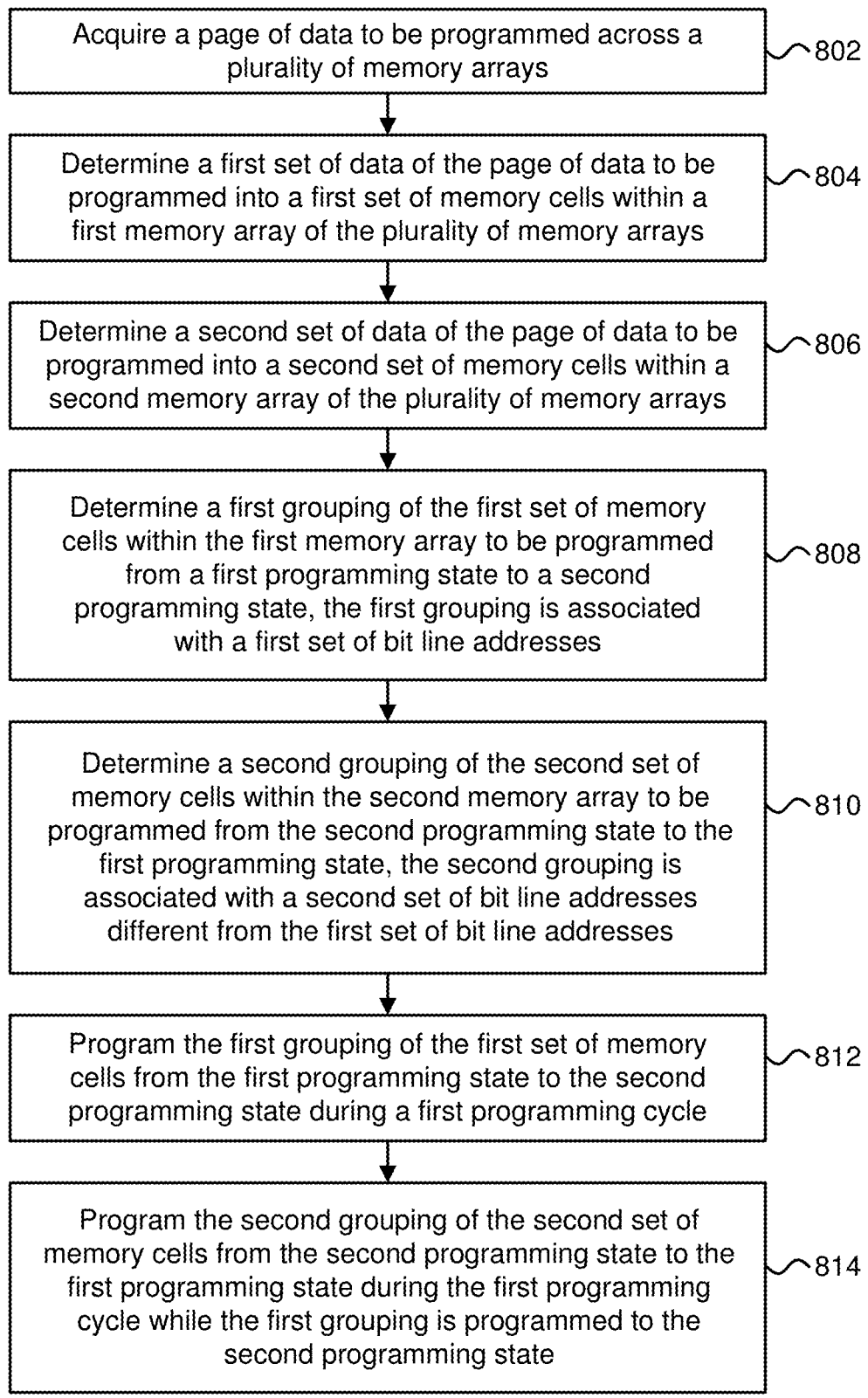
FIG. 8 depicts a flowchart describing another embodiment of a process for programming a non-volatile storage system.

FIG. 8 depicts a flowchart describing another embodiment of a process for programming a non-volatile storage system. In one embodiment, the process of FIG. 8 may be performed by a memory system, such as memory system 101 in FIG. 1A.

In step 802, a page of data to be programmed across a plurality of memory arrays is acquired. In one example, the page of data may comprise 4 KB of data and the plurality of memory arrays may comprise 256 memory arrays. In step 804, a first set of data of the page of data to be programmed into a first set of memory cells within a first memory array of the plurality of memory arrays is determined. In step 806, a second set of data of the page of data to be programmed into a second set of memory cells within a second memory array of the plurality of memory arrays is determined.

In step 808, a first grouping of the first set of memory cells within the first memory array to be programmed from a first programming state to a second programming state is determined. In some cases, the first grouping may be associated with a first set of bit line addresses. The first grouping may be associated with sixteen memory cells within the first memory array to be RESET. In one embodiment, control circuitry, such as memory chip controller 105 in FIG. 1A or control circuitry located within a memory bay, may acquire the first set of data, read data associated with memory cells connected to a word line within the first memory array, compare the data read from the memory cells connected to the word line with the first set of data, identify the number of memory cells connected to the word line that need to be programmed from a "0" data state to a "1" data state based on the comparison, and determine a grouping of the memory cells connected to the word line that need to be programmed to the "1" data state (e.g., the grouping may comprise the first sixteen memory cells that need to be programmed to the "1" data state).

In step 810, a second grouping of the second set of memory cells within the second memory array to be programmed from the second programming state to the first programming state is determined. In some cases, the second grouping may be associated with a second set of bit line addresses different from the first set of bit line addresses. The second grouping may be associated with sixteen memory cells within the second memory array to be SET. In one embodiment, control circuitry, such as memory chip controller 105 in FIG. 1A or control circuitry located within a memory bay, may acquire the second set of data, read data associated with memory cells connected to a word line within the second memory array, compare the data read from the memory cells connected to the word line with the second set of data, identify the number of memory cells connected to the word line that need to be programmed from a "1" data state to a "0" data state based on the comparison, and determine a grouping of the memory cells connected to the word line that need to be programmed to the "0" data state (e.g., the grouping may comprise the first sixteen memory cells that need to be programmed to the "0" data state).

In step 812, the first grouping of the first set of memory cells is programmed from the first programming state to the second programming state during a first programming cycle (or a first column cycle). In step 814, the second grouping of the second set of memory cells is programmed from the second programming state to the first programming state during the first programming cycle while the first grouping is programmed to the second programming state. In one embodiment, the first programming state may correspond with a low resistance state and the second programming state may correspond with a high resistance state. In another embodiment, the first programming state may correspond with a high resistance state and the second programming state may correspond with a low resistance state.

In some cases, prior to programming the first set of data into the first set of memory cells, a read-before-write (RBW) operation may be performed on the first memory array to load data from the first memory array into a page register. The page register and/or control circuitry in communication with the page register may then determine a first number of RESET cycles and a second number of SET cycles that will be required to program the first set of data into the first set of memory cells. The control circuitry may configure column decoders with independent bit line to read/write circuit addressing to group or combine a first portion of the first set of memory cells to be RESET and then RESET the first portion of the first set of memory cells. The control circuitry may configure column decoders with independent bit line to read/write circuit addressing to group or combine a second portion of the first set of memory cells to be SET and then SET the second portion of the first set of memory cells. During each of the first number of RESET cycles, a selected word line connected to the first set of memory cells may be set to a first voltage (e.g., 0V). During each of the second number of SET cycles, the selected word line connected to the first set of memory cells may be set to a second voltage greater than the first voltage (e.g., 2V).

One embodiment of the disclosed technology includes acquiring a first set of data to be programmed into a first set of memory cells within a first memory array, acquiring a second set of data to be programmed into a second set of memory cells within a second memory array, determining a first grouping of the first set of memory cells to be programmed from a first programming state to a second programming state, determining a second grouping of the second set of memory cells to be programmed from the second programming state to the first programming state, programming the first grouping of the first set of memory cells from the first programming state to the second programming state during a first programming cycle, and programming the second grouping of the second set of memory cells from the second programming state to the first programming state during the first programming cycle.

One embodiment of the disclosed technology includes one or more control circuits in communication with a plurality of memory arrays. The plurality of memory arrays includes a first memory array and a second memory array. The one or more control circuits configured to acquire a first set of data to be programmed into a first set of memory cells within the first memory array and configured to acquire a second set of data to be programmed into a second set of memory cells within the second memory array. The one or more control circuits configured to determine a first grouping of the first set of memory cells to be programmed from a first programming state to a second programming state and configured to determine a second grouping of the second set of memory cells to be programmed from the second programming state to the first programming state. The one or more control circuits configured to cause the first grouping of the first set of memory cells to be programmed from the first programming state to the second programming state during a first programming cycle. The one or more control circuits configured to cause the second grouping of the second set of memory cells to be programmed from the second programming state to the first programming state during the first programming cycle while the first grouping of the first set of memory cells is programmed to the second programming state.

One embodiment of the disclosed technology includes acquiring a page of data to be programmed across a plurality of memory arrays, determining a first set of data of the page of data to be programmed into a first set of memory cells within a first memory array of the plurality of memory arrays, determining a second set of data of the page of data to be programmed into a second set of memory cells within a second memory array of the plurality of memory arrays, determining a first grouping of the first set of memory cells to be RESET during a first programming cycle, determining a second grouping of the second set of memory cells to be SET during the first programming cycle, performing a RESET operation on the first grouping of the first set of memory cells during the first programming cycle, and performing a SET operation on the second grouping of the second set of memory cells during the first programming cycle while the RESET operation is performed on the first grouping of the first set of memory cells.

For purposes of this document, a first layer may be over or above a second layer if zero, one, or more intervening layers are between the first layer and the second layer.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements.

When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for operating a non-volatile storage system, comprising:
   acquiring a first set of data to be programmed into a first set of memory cells within a first memory array;
   acquiring a second set of data to be programmed into a second set of memory cells within a second memory array;
   determining a first grouping of the first set of memory cells to be programmed from a first programming state to a second programming state;
   determining a second grouping of the second set of memory cells to be programmed from the second programming state to the first programming state;
   programming the first grouping of the first set of memory cells from the first programming state to the second programming state during a first programming cycle; and
   programming the second grouping of the second set of memory cells from the second programming state to the first programming state during the first programming cycle.

2. The method of claim 1, wherein:
   the programming the second grouping includes programming the second grouping to the first programming state at the same time that the first grouping of the first set of memory cells is programmed to the second programming state.

3. The method of claim 1, further comprising:
   determining a plurality of groupings for the first set of memory cells associated with RESETTING the first set of memory cells over a plurality of programming cycles, the plurality of groupings includes the first grouping of the first set of memory cells.

4. The method of claim 3, wherein:
   the plurality of groupings comprises a number of groupings, the number of groupings is set based on the ceiling of a number of memory cells of the first set of memory cells to be RESET during the plurality of programming cycles divided by a maximum number of memory cells that may be simultaneously programmed during any cycle of the plurality of programming cycles.

5. The method of claim 1, wherein:
   the programming the first grouping includes configuring one or more column decoders with independent bit line to read/write circuit addressing to select the first grouping of the first set of memory cells.

6. The method of claim 1, wherein:
   the first set of data comprises a first portion of a page of data; and
   the second set of data comprises a second portion of the page of data.

7. The method of claim 1, wherein:
   each memory cell of the first set of memory cells is connected to a first word line of the first memory array; and
   each memory cell of the second set of memory cells is connected to a second word line of the second memory array.

8. The method of claim 1, wherein:
   the first grouping corresponds with a first set of non-contiguous bit line addresses; and
   the second grouping corresponds with a second set of non-contiguous bit line addresses different from the first set of non-contiguous bit line addresses.

9. The method of claim 1, wherein:
   the programming the first grouping includes performing a RESET operation on the first memory array; and
   the programming the second grouping includes performing a SET operation on the second memory array.

10. The method of claim 1, wherein:
    the first memory array comprises a non-volatile memory that is monolithically formed in one or more physical levels of memory cells having active areas disposed above a silicon substrate.

11. The method of claim 1, wherein:
    the first memory array comprises a three-dimensional memory array.

12. A non-volatile storage system, comprising:
    a plurality of memory arrays, the plurality of memory arrays includes a first memory array and a second memory array; and
    one or more control circuits in communication with the plurality of memory arrays, the one or more control circuits configured to acquire a first set of data to be programmed into a first set of memory cells within the first memory array and configured to acquire a second set of data to be programmed into a second set of memory cells within the second memory array, the one or more control circuits configured to determine a first grouping of the first set of memory cells to be programmed from a first programming state to a second programming state and configured to determine a second grouping of the second set of memory cells to be programmed from the second programming state to the first programming state, the one or more control circuits configured to cause the first grouping of the first set of memory cells to be programmed from the first programming state to the second programming state during a first programming cycle, the one or more control circuits configured to cause the second grouping of the second set of memory cells to be programmed from the second programming state to the first programming state during the first programming cycle while the first grouping of the first set of memory cells is programmed to the second programming state.

13. The non-volatile storage system of claim 12, wherein:
    the one or more control circuits configured to determine a plurality of groupings for the first set of memory cells associated with RESETTING the first set of memory cells over a plurality of programming cycles, the plurality of groupings includes the first grouping of the first set of memory cells.

14. The non-volatile storage system of claim 13, wherein:
the plurality of groupings comprises a number of groupings, the one or more control circuits configured to determine the number of groupings based on the ceiling of a number of memory cells of the first set of memory cells to be RESET during the plurality of programming cycles divided by a maximum number of memory cells that may be simultaneously programmed during any cycle of the plurality of programming cycles.

15. The non-volatile storage system of claim 12, wherein:
the one or more control circuits configured to configure one or more column decoders with independent bit line to read/write circuit addressing to select the first grouping of the first set of memory cells during the first programming cycle.

16. The non-volatile storage system of claim 12, wherein:
each memory cell of the first set of memory cells is connected to a first word line of the first memory array; and
each memory cell of the second set of memory cells is connected to a second word line of the second memory array.

17. The non-volatile storage system of claim 12, wherein:
the first grouping corresponds with a first set of non-contiguous bit line addresses; and
the second grouping corresponds with a second set of non-contiguous bit line addresses different from the first set of non-contiguous bit line addresses.

18. The non-volatile storage system of claim 12, wherein:
each memory cell of the first grouping is RESET during the first programming cycle; and
each memory cell of the second grouping is SET during the first programming cycle.

19. A method for operating a non-volatile storage system, comprising:
acquiring a page of data to be programmed across a plurality of memory arrays;
determining a first set of data of the page of data to be programmed into a first set of memory cells within a first memory array of the plurality of memory arrays;
determining a second set of data of the page of data to be programmed into a second set of memory cells within a second memory array of the plurality of memory arrays;
determining a first grouping of the first set of memory cells to be RESET during a first programming cycle;
determining a second grouping of the second set of memory cells to be SET during the first programming cycle;
performing a RESET operation on the first grouping of the first set of memory cells during the first programming cycle; and
performing a SET operation on the second grouping of the second set of memory cells during the first programming cycle while the RESET operation is performed on the first grouping of the first set of memory cells.

20. The method of claim 19, further comprising:
determining a plurality of groupings for the first set of memory cells associated with RESETTING the first set of memory cells over a plurality of programming cycles, the plurality of groupings includes the first grouping of the first set of memory cells, the plurality of programming cycles includes the first programming cycle, the plurality of groupings comprises a number of groupings, the number of groupings is set based on the ceiling of a number of memory cells of the first set of memory cells to be RESET during the plurality of programming cycles divided by a maximum number of memory cells that may be simultaneously programmed during any cycle of the plurality of programming cycles.

* * * * *